Feb. 25, 1941.   C. A. NERACHER ET AL   2,232,797
POWER TRANSMISSION
Filed Jan. 21, 1938   8 Sheets-Sheet 8

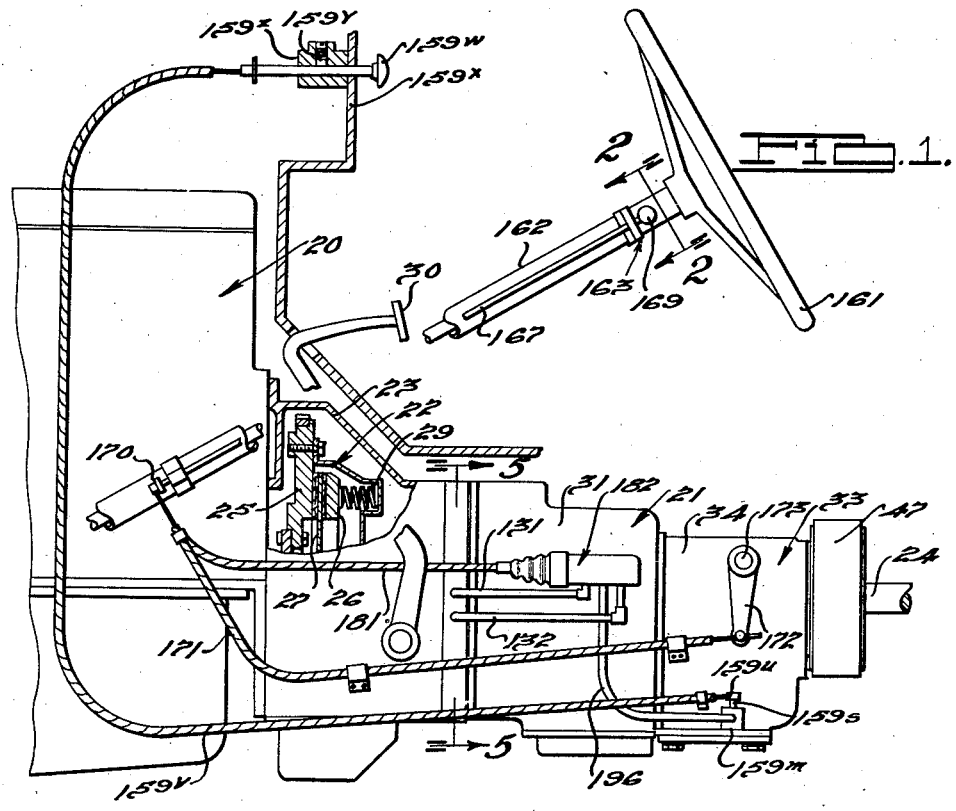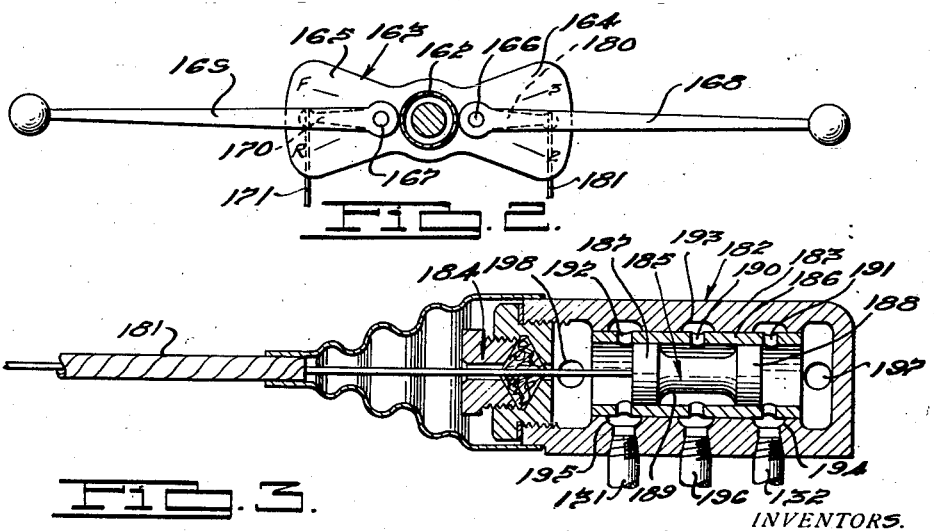

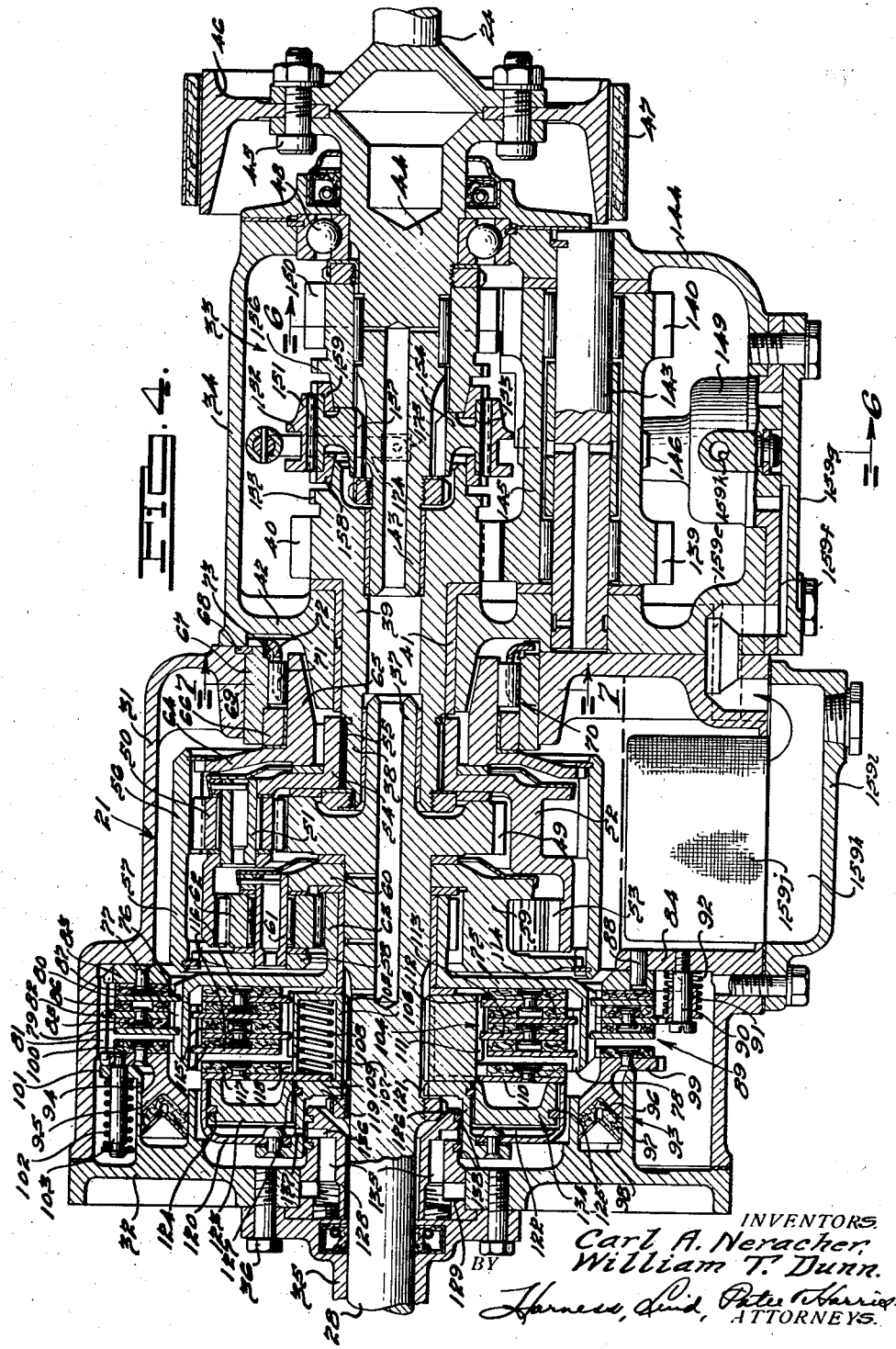

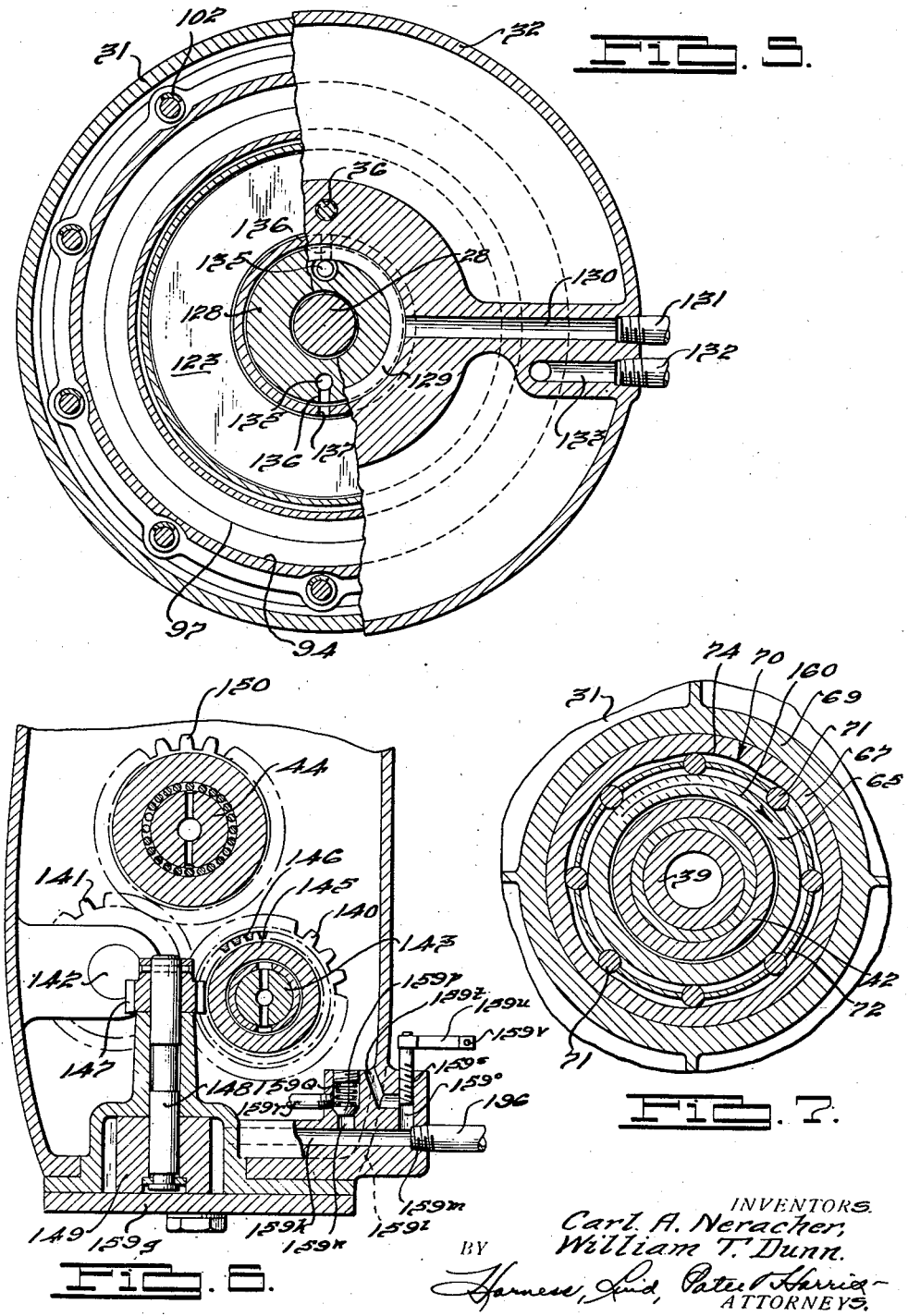

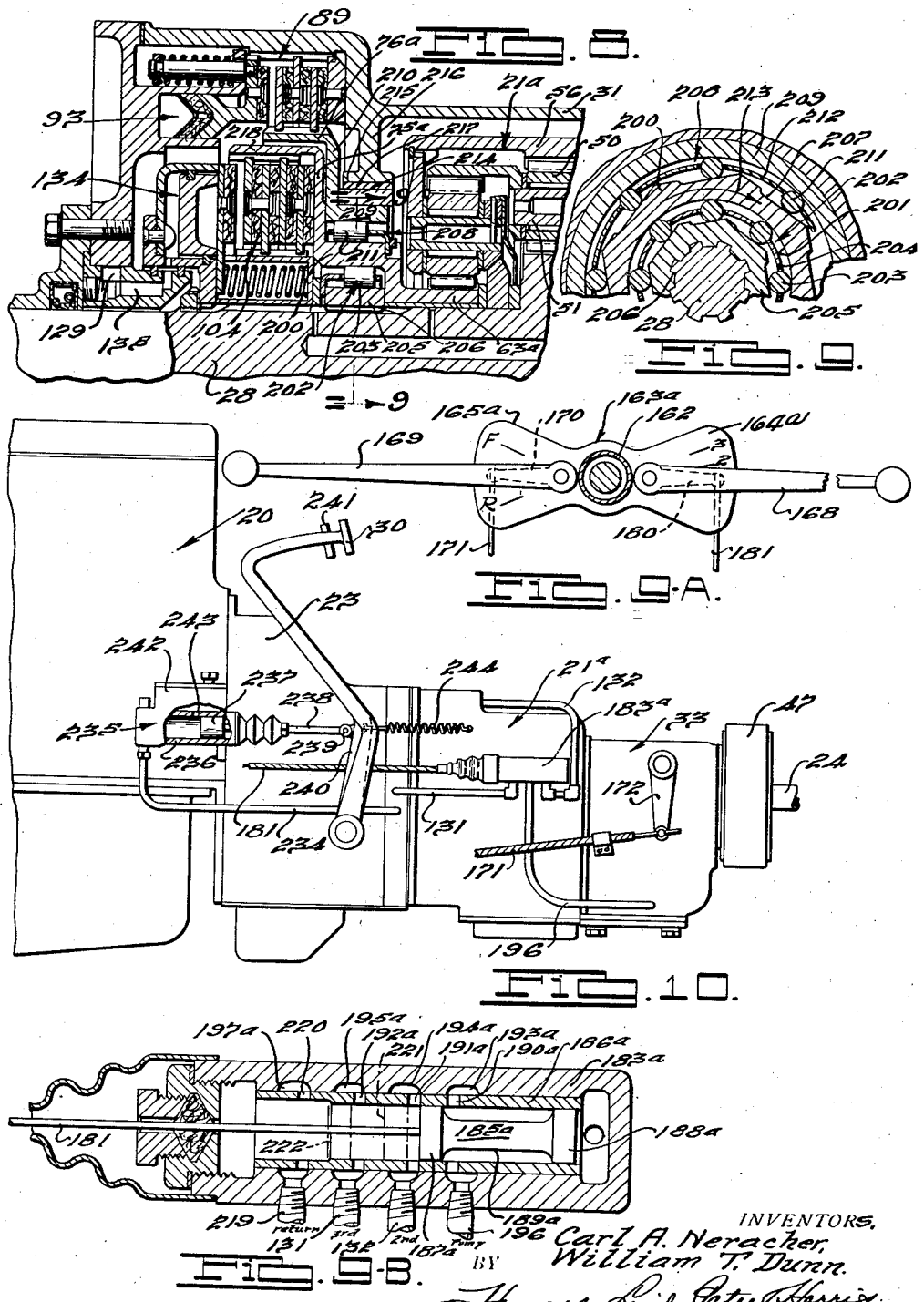

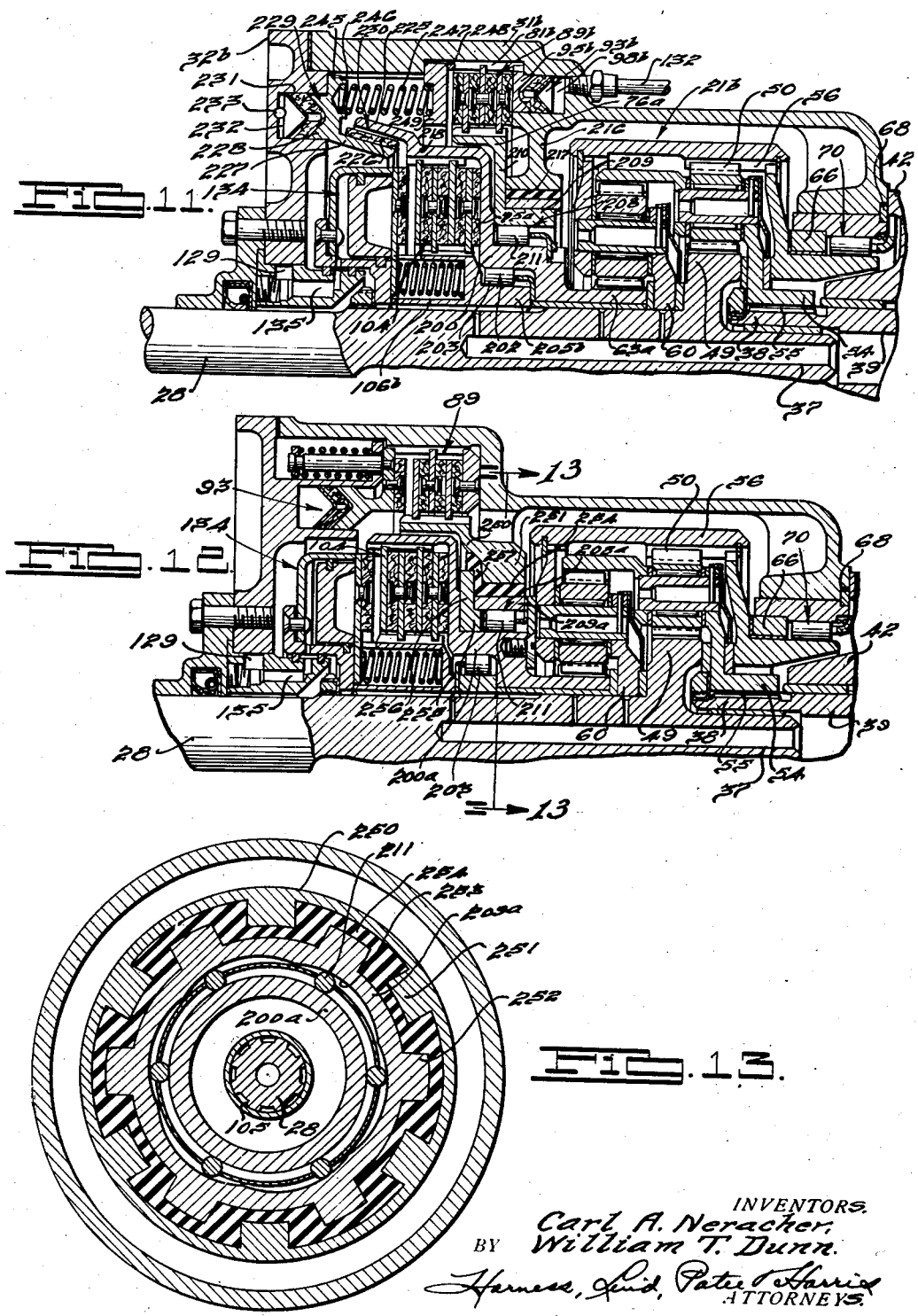

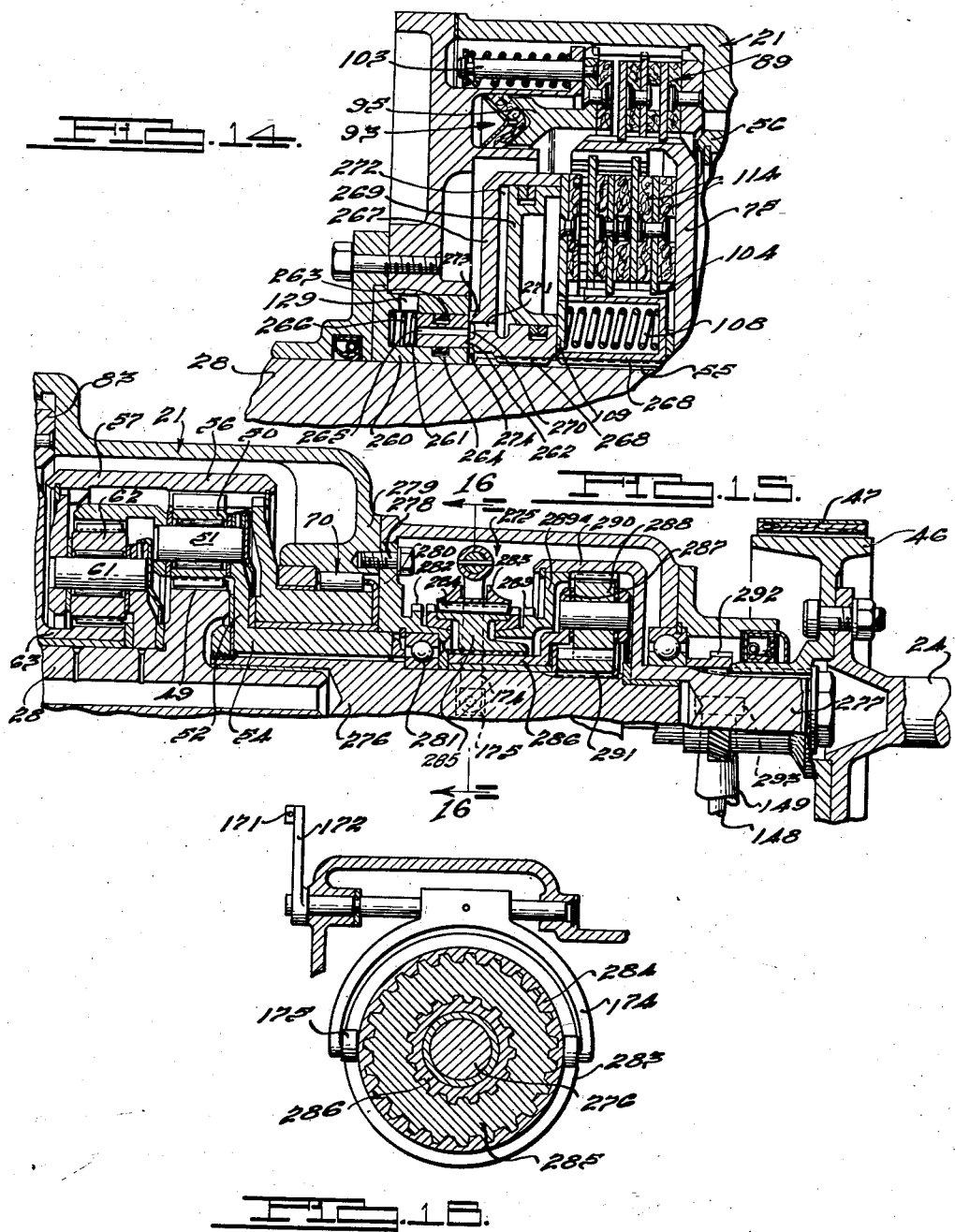

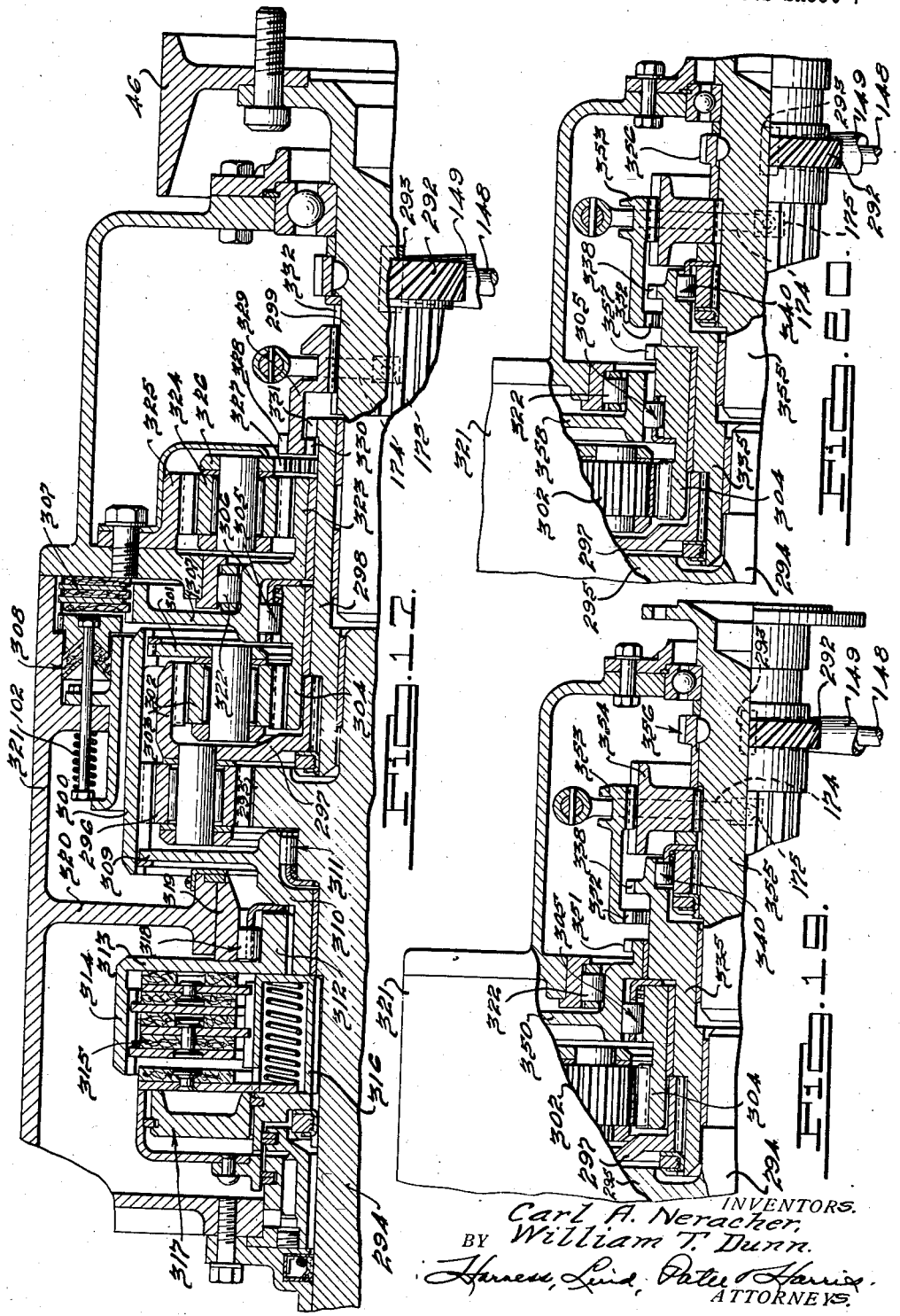

INVENTORS.
Carl A. Neracher,
William T. Dunn.
BY
Harness, Dickey, Pierce & Harris
ATTORNEYS.

Patented Feb. 25, 1941

2,232,797

UNITED STATES PATENT OFFICE 2,232,797

POWER TRANSMISSION

Carl A. Neracher and William T. Dunn, Detroit, Mich., assignors to Chrysler Corporation, Highland Park, Mich., a corporation of Delaware Application January 21, 1938, Serial No. 186,144

64 Claims. (Cl. 74—262)

This invention relates to power transmissions and controls therefor especially adapted for driving motor vehicles.

Our invention is primarily directed to improvements in transmission systems employing planetary gearing although many of the novel features of our invention are not necessarily limited to transmissions of the planetary gear type.

Among the objects of our invention are the following: the provision of a transmission affording improved simplification, long life, ease of manipulation, and smoothness of operation for the various speed ratio changes; the provision of a transmission in which the speed changes up or down are effected with improved rapidity and freedom from shock on the transmission parts and lurching of the vehicle; the provision of a transmission incorporating a novel system of overrunning devices cooperating with the various elements in the transmission to provide improved and simplified gearing arrangements and controls therefor; the provision of a transmission wherein many of the speed ratio changes are effected by automatic synchronization of the driving and driven parts; and the provision of a transmission control system affording automatic changes in the drives in an improved and simplified manner.

Further objects and advantages of our invention reside in the novel combination and arrangement of parts more particularly referred to in detail hereinafter, reference being made to the accompanying drawings in which:

Fig. 1 is a side elevational view of our power transmission somewhat diagrammatically illustrated.

Fig. 2 is a sectional plan view taken as indicated by line 2—2 of Fig. 1.

Fig. 3 is a sectional elevational view of the distributor valve shown in elevation in Fig. 1.

Fig. 4 is a sectional elevational view through the transmission illustrating the driving gear trains.

Fig. 5 is a transverse sectional elevational view taken as indicated by the line 5—5 of Fig. 1, with parts broken away.

Fig. 6 is a further transverse sectional elevational view taken as indicated by the line 6—6 of Fig. 4.

Fig. 7 is a detail sectional view taken through the low speed controlling braking device, the view being taken as indicated by line 7—7 of Fig. 4.

Fig. 8 is a fragmentary view of a transmission substantially like Fig. 4 but modified in its structure.

Fig. 9 is a sectional view taken as indicated by the line 9—9 of Fig. 8.

Fig. 9A is a view corresponding to Fig. 2 but illustrating the corresponding control for the Fig. 8 transmission.

Fig. 9B is a view corresponding to Fig. 3 but illustrating the corresponding distributor valve for the Fig. 8 transmission.

Fig. 10 is a sectional elevational view of the Fig. 1 power transmission having certain modifications thereover.

Fig. 11 is a view of a transmission generally similar to the Fig. 8 transmission but modified thereover to accommodate the Fig. 10 system of control.

Fig. 12 is a view of a transmission generally similar to the Fig. 8 transmission but showing a further modified arrangement of parts.

Fig. 13 is a sectional view taken as indicated by line 13—13 of Fig. 12.

Fig. 14 is a fragmentary view of our transmission illustrating a modified arrangement of oil pressure inlet to the direct speed controlling clutch.

Fig. 15 is a longitudinal half-sectional elevational view of a modified form of forward and reverse drive control employing planetary gearing.

Fig. 16 is a sectional view taken as indicated by line 16—16 of Fig. 15.

Fig. 17 is a longitudinal half-sectional elevational view of another modified form of our transmission having functions substantially similar to the Fig. 8 transmission but employing planetary reversing gearing.

Fig. 19 is a longitudinal sectional view, partly in side elevation, illustrating a modified forward and reverse control for the Fig. 18 transmission.

Fig. 20 is a view similar to Fig. 19 but illustrating another modified forward and reverse control for the Fig. 18 transmission.

Figure 18:
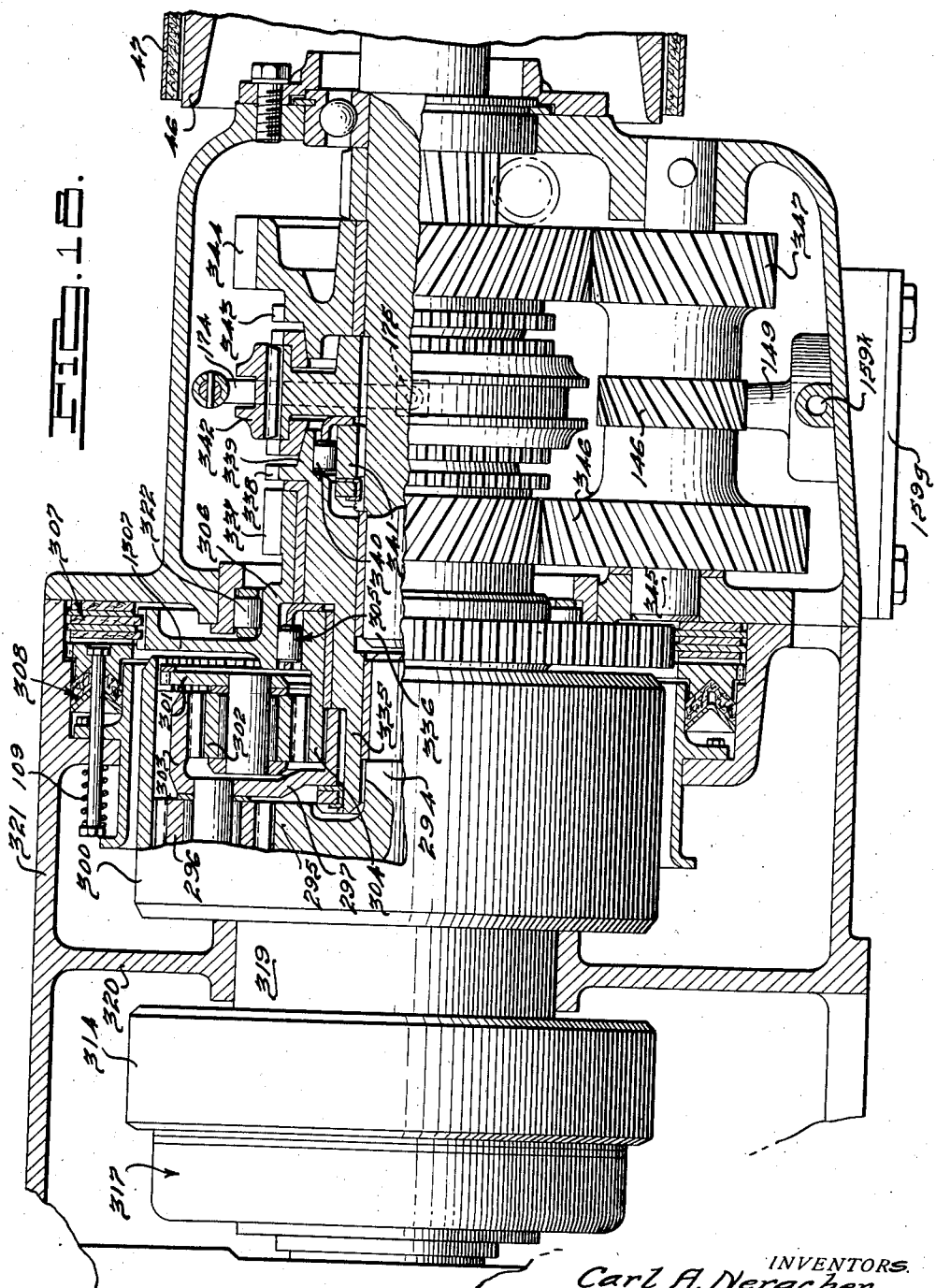
Fig. 18 is a longitudinal sectional elevational view showing a further modified arrangement of forward and reverse drive for the Fig. 17 arrangement of forwardly driving planetary gearing, a portion of the transmission being shown in side elevation.

Referring to the drawings, reference character 20 represents the motor vehicle prime mover such as the usual internal combustion engine driving to the transmission 21 through a suitable main clutch 22 in housing 23, a power take-off or driven tail-shaft 24 transmitting the drive from the transmission to the driving ground wheels of the motor vehicle in the well known manner.

The main clutch 22 may be of the usual friction plate type of commercial design in which engine flywheel 25 drives the pressure plate 26, a friction disk 27 receiving the drive and thereby driving shaft 28 which is the drive shaft for transmission 21. The usual springs 29 load pressure plate 26 toward flywheel 25 to engage the clutch, a foot pedal 30 being controlled by the operator to release the clutch in the customary manner.

The transmission 21 comprises, in the present embodiment of our invention, forwardly driving planetary gear trains and a countershaft type forward and reverse unit receiving the drive from the planetary trains. Thus the planetary gearing is contained within a main casing 31 to which is attached a front cover 32, the forward and reverse drive mechanism 33 being housed in a casing 34 secured to the rear of casing 31.

The transmission drive shaft 28 has a forward journal 35 which is secured at 36 to cover 32, the rear end of shaft 28 being piloted at 37 in the forward end 38 of an intermediate hollow driven shaft 39 formed with a driving pinion 40. The shaft 39 is journalled at 41 in the transverse wall 42 of casing 34 and journals the piloting forward end 43 of driven shaft or tailshaft 44, the latter being secured to shaft 24 by fasteners 45 which also carry a propeller shaft brake drum 46 engageable by a friction brake 47 for use as a vehicle parking or emergency brake. Shaft 44 is journalled at 48 in the rear end of casing 34.

The planetary gearing comprises a primary driving sun gear 49 which may be formed integrally with shaft 28 for direct drive therefrom, this sun gear of the first planetary gear train meshing with a plurality of planet pinions 50 which are spaced around the sun gear, one being illustrated in Fig. 4. Each pinion 50 is journalled on a shaft 51 supported by the carrier structure 52 which has portions forming the forwardly projecting annulus or internal gear 53 and the rearwardly extending hub 54 which has a splined driving connection 55 with shaft portion 38.

Planet pinions 50 mesh with the annulus gear 56 which has a forwardly projecting cylindrical extension 57 having fixed thereto the inwardly projecting portion 58 of a second carrier structure 59, the latter having a rear inwardly extending portion 60 journalling the carrier structure on shaft 28. This carrier structure likewise has a plurality of shafts 61 each journalling a planet pinion 62 meshed with annulus gear 53 and a second sun gear 63 loosely journalled on shaft 28 to form the second planetary gear train.

Drivingly connected to the rear end of annulus gear 56 is an annular spider 64 formed with a rearwardly extending cylindrical hub 65 journalled at 66 to the cylinder 67 non-rotatably fixed at 68 within the cylindrical portion 69 of casing 31. The cylindrical members 65 and 67 provide the inner and outer parts respectively of an overrunning control or brake device 70. A plurality of frictionally wedged cylinders or rollers 71 are disposed between the cylindrical members, the rollers being spaced by a cage 72 yieldingly urged by spring 73 in a counter-clockwise direction, as seen in Fig. 7, toward the wedging or clutching position of the rollers. One cylindrical member, as member 67 for example, has its roller engaging surface formed with a series of cam faces 74 so arranged that rollers 71 will freely accommodate clockwise rotation of hub 65 and annulus gear 56 but immediately wedging the rollers when hub 65 tends to rotate counterclockwise thereby preventing such counterclockwise rotation. The reaction overrunning device 70 is a braking means for the annulus gear 56 since it holds this gear from rotating backwardly and automatically releases the gear for rotation forwardly.

The sun gear 63 is formed with a spider 75 having the annular drum 76 formed with axially extending external splines 77 and internal splines 78. The external splines 77 are slidably and drivingly engaged by a plurality of drive plates 79, 80. The casing 31 carries splines 81 engaged by a non-rotating but axially slideable plate 82 and a rear plate 83 which has its rearward sliding movement limited by the casing wall portion 84. The plate 82 carries annular friction mats 85 and 86 respectively engaging drive plates 79 and 80. Plate 80 is engaged by a rear mat 87 carried by plate 83. The wall portion 84 carries one or more pins 88 which cooperate with splines 81 in slidably centering and guiding the plate 83.

The frictionally engageable plates and mats between fixed splines 81 and rotatable splines 77 provide a frictional control on the sun gear 63 which may be termed a rotary control element of the planetary gearing for controlling speed ratio change in the transmission. More particularly, this friction control, which is generally designated at 89, is a braking device since it is adapted to hold sun gear 63 against rotation by connecting the same to the stationary casing 31.

The wall portion 84 carries a pin 90 slidably mounting a thimble 91 urged forwardly by a spring 92 whereby the thimble urges plate 82 forwardly to unpack or disengage the friction elements of the braking device 89. For packing the friction elements to engage this braking device we have provided fluid pressure operating means in the form of a motor 93. This motor comprises an annular cylinder 94 carried by the cover 32 and slidably receiving the annular piston 95 which is annularly grooved at 96 to receive the annular grooved packing 97 arranged to deflect radially into tight sealing fit with cylinder 94 when subjected to pressure fluid in the annular pressure chamber 98.

The piston 95 has an annular pressure flange 99 splined to slidably engage the fixed splines 81, a friction mat 100 being carried by the flange 99. The cover 32 has an abutment 101 limiting forward brake releasing movement of piston 95 and mat 100 under the influence of one or more springs 102 which act between abutment 101 and studs 103 which project forwardly from flange 99 for sliding through the abutment.

A further friction control is operably associated with sun gear 63 whereby the latter may be directly drivingly connected to the driving shaft 28 for a direct drive through the transmission 21. More particularly, this friction control, generally designated at 104, is a clutching device since it drivingly connects rotating parts.

Fixed to shaft 28 by splines 105 is the driving spring cage 106 formed with a plurality of forwardly opening cylinders 107 for coil springs 108 which yieldingly urge the finger portions 109 of pressure plate 110 forwardly to its clutch disengaging position. The periphery of cage 106 is formed with axially extending splines 111 slidably driving plates 112, 113 respectively carrying friction mats 114, 115 which drive the driven plates 116 engaging internal splines 78. The pressure plate 110 carries a mat 117 which is adapted to move rearwardly to pack the various mats and plates against the spider 75 to drive sun gear 63 from cage 106 and shaft 28. The pressure plate 110 is driven by cage 106 by the fingers 109 extending through cage slots 118 which accommodate axial movement of plate 110.

When clutch 104 is disengaged, as in Fig. 4, springs 108 move plate 110 against the hub 119 of the rotating annular cylinder structure 120, the hub having a splined drive connection at 121 with shaft 28. The annular cylinder structure 120 provides a pressure fluid chamber 122 forwardly of an annular piston 123 movable rearwardly in the cylinder to urge mat 117 into packing engagement with the various clutching elements of clutch 104. Piston 123 carries an expanding sealing ring 124 slidably engaging the outer wall 125 of cylinder 120 while the inner wall 126 of the cylinder carries a second ring 127 slidably engaging piston 123.

Clamped between journal member 35 and cover 32 is a fixed pressure fluid conductor member 128 having an annular pressure fluid inlet port 129 (see Figs. 4 and 5) which communicates with a radially disposed passage 130 adapted to receive pressure fluid from a direct or third speed supply pipe 131. A second pipe 132 is adapted to supply pressure fluid to the second speed motor 93 by reason of a radial passage 133 which opens inwardly to the pressure chamber 98.

The piston 123 and cylinder 120 constitute a third speed motor 134, pressure fluid from passage 130 entering port 129 for delivery forwardly through passages 135 and thence outwardly at 136 to inlet ports 137 for chamber 122. Bounding the outlets 136 are a pair of expanding sealing rings 138 engaging cylinder wall 126.

When the chamber 122 is vented, springs 108 acting on plate 110 move piston 123 forwardly until plate 110 engages the cylinder portion 125 and the hub 119.

Referring to the forward and reverse drive mechanism 33, the driving pinion 40 meshes with countershaft cluster gear 139, a second gear 140 meshing with reverse idler gear 141 (see Fig. 6) mounted on a countershaft 142. The cluster gears 139, 140 are mounted on a countershaft 143 supported in wall 42 and the rear wall 144 of casing 34. The cluster gear shaft 145 has a gear 146 meshing with gear 147 fixed to shaft 148 for driving any suitable type of pump, such as a gear pump 149 adapted to deliver pressure fluid, such as oil, selectively to motors 93 and 134.

Idler gear 141 has constant mesh with a gear 150 loose on driven shaft 44. A shiftable clutch sleeve 151 is provided with a yoke-receiving shift groove 152 and has clutch teeth 153 splined to a hub 154 and selectively engageable with clutch teeth 155, 156 respectively carried with gears 40 and 150. Hub 154 has splined connection at 157 with shaft 44. Associated with sleeve 151 is a synchromesh mechanism herein diagrammatically illustrated but more fully disclosed in the copending application of Otto E. Fishburn, Serial No. 180,840, filed December 20, 1937, which is a continuation of Serial No. 108,123, filed October 29, 1936. While other forms of synchronizers may be used, or none at all, we preferably employ the aforesaid type including the servo friction clutching elements 158, 159 which frictionally synchronize gears 40 and 150 respectively with shaft 44 and prevent positive clutching of teeth 153 with either of the clutch teeth 155 or 156 until synchronization has been brought about.

The pump 149 draws fluid, such as oil from a suitable reservoir in transmission casing 31 or 34. In Fig. 4 these casings are open to each other at 159$^e$ so that oil may flow between them, the pump having intake conduit 159$^f$, in the bottom cover 159$^g$, communicating with the well 159$^h$ in the bottom cover 159$^i$ of the casing 31. This well has a screen 159$^j$ through which oil is strained for passage to the pump 149. As best shown in Fig. 6, the pump delivers oil pressure through an outlet 159$^k$ in boss 159$^l$ which leads to delivery at 159$^m$ for distribution to motors 93 and 134. Between the pump and delivery 159$^m$ there are two upwardly extending passages 159$^n$ and 159$^o$.

Passage 159$^n$ opens to a disc valve 159$^p$ loaded by spring 159$^q$ sufficient to build up the desired pressure at delivery 159$^m$, excess pressure unseating valve 159$^p$ and escaping through outlet 159$^r$ which preferably is distributed to the various gears and bearings in the transmission for lubrication purposes.

The passage 159$^o$ has to do with the build up of the pressure fluid by the pump after the vehicle has been brought to rest. Inasmuch as the pump 149 is drivingly connected with the gear 40 and the driven shaft 44 (with shifter 151 shifted either forwardly or rearwardly), the pump will lose its pressure when the vehicle stops and likewise the pressure will fall beyond the delivery 159$^m$ as will presently be more apparent. When the vehicle stops then shaft 44 is also at rest, the engine being permitted to operate at its idling speed by release of the main clutch 22, the shifter 151 being preferably left in its shifted position for a temporary stop. A back leakage flow through most pumps will take place and especially through a gear-type pump so that if desired the passage 159$^o$ may in many instances be omitted. However, where the back flow is not as fast as desired, or where it is desired to vary the pump pressure build-up characteristics, for reasons presently apparent, the passage 159$^o$ is provided for a metered escaping flow or to restricted vent for the outlet 159$^k$. To this end an adjustable valve 159$^s$ is threaded in the upper end of passage 159$^o$ to vary the outlet from this passage to an escape 159$^t$ opening to the bottom of casing 34. The oil collecting in casing 34 passes to casing 31 by the aforesaid passages 159$^e$.

We preferably provide a remote control for varying valve 159$^s$ so that the pump pressure build-up and the functioning of the transmission may be varied by the driver while operating the vehicle.

Secured to the upper end of valve 159$^s$ is a lever 159$^u$ operated by a Bowden wire 159$^v$ leading to a push-pull hand control 159$^w$ at dash 159$^x$. A spin loaded friction shoe 159$^y$ is carried by the guide bracket 159$^z$ so that the control 159$^w$ will stay in any position of adjustment. The threads of valve 159$^s$ are of such pitch and the parts are otherwise so arranged that for the range of movement of control 159$^w$, the valve 159$^s$ may be positioned to entirely close or open the escape 159$^t$.

As thus far described the speed ratio drives, apart from the controlling means which will hereinafter be described, functions as follows. The transmission is illustrated in its neutral setting and to drive forwardly in the low or first speed ratio setting, the main clutch 22 is released and sleeve 151 shifted forwardly to clutch gear 40 and shaft 39 with driven shaft 44. The sleeve 151 is left in its forwardly shifted position for all forward vehicle drives. The main clutch 22 is now engaged causing the engine to drive shaft 28 and sun gear 49 independently of pressure fluid from pump 149. At this time brake 89 and clutch 104 are released, for a low speed setting, so that the sun gear 63 is free. Since carrier 52 is connected to shaft 39 and thereby loaded, the forwardly driving sun gear 49, driving clockwise when looking front to rear, acts through planet pinions 50 and tends to drive annulus gear 56 backwards which however is prevented by a locking of overrunning device 70. Therefore the annulus becomes fixed and carrier 52 drives shaft 39 at a forward relatively low speed reduction ratio.

This low speed provides for a condition of freewheeling of the vehicle in the low speed ratio, this being of advantage in providing speed ratio changes free from objectionable shock or jolt to the vehicle passengers or transmission parts. Thus, a change may be made from second or high down to low, by releasing the brake 89 or clutch 104 as the case may be, without any jolt because the vehicle will coast until the engine is speeded up sufficiently to pick up the drive from shaft 28 to shaft 39 through the low speed gear ratio by locking overrunning device 70 as aforesaid. Even with a dead engine the vehicle will free-wheel in low, viz., merely with shifter 151 clutched with teeth 155. The vehicle may be towed to start the engine in second or direct speed settings by building up pressure at pump 149 which is driven by the drive shaft 44 and gear 40 with shifter 151 clutched forwardly and selector lever 168 set at "2" or "3". For this towing condition the valve 159$^s$ is preferably positioned to close vent 159$^t$ to facilitate building up the pressure under such slow running conditions.

To drive in the intermediate or second speed ratio setting, pressure fluid is introduced to the second speed supply pipe 132 for passage to chamber 98 to actuate the second speed motor 93. This operation causes piston 95 to smoothly engage the braking device 89 for holding sun gear 63 against rotation. This results in a reduction forward drive faster than the low speed ratio by compounding the second speed planetary gear train through the low speed train. Thus sun gear 49 drives pinions 50 but since sun gear 63 is fixed, annulus gear 56 now revolves forwardly at a relatively slow speed, such forward rotation being permitted by overrunning device 70. The arrow 160 in Fig. 7 represents forward rotation of hub 65.

In this second speed drive there is no freewheeling of the vehicle because sun gear 63 being held, the vehicle will drive the engine through the compounded planetary trains. A down selection may be made from third to second without releasing the main clutch 21.

For the third speed ratio drive which is a direct or 1 to 1 drive, the second speed brake 89 is released by venting the pressure fluid at motor 93 and pressure fluid is introduced to chamber 122 through pipe 131 and the communicating passages 130, 129, 135, 136 and 137. Motor 134 then operates to engage clutch 104 to effect a direct drive from shaft 28 to sun gear 63. The two planetary gear trains are thereby locked so that all the elements thereof rotate as a unit and shaft 28 drives shaft 39 for a direct forward drive. This drive causes forward rotation of hub 65 which maintains rollers 71 of overrunning device 70 free from wedging. This direct drive does not embody free-wheeling of the vehicle since the vehicle may drive the engine through the locked gear trains.

For driving the vehicle in reverse, the sleeve 151 is shifted rearwardly to clutch with teeth 156 of gear 150. Shaft 39 then drives through gears 40, 139, 140, 141 and 150 for driving shaft 44 in reverse or backwardly with respect to the forward rotation of shaft 28. Ordinarily the reverse drive is effected merely by shifting sleeve 151 rearwardly because the transmission 21 will always provide the low speed ratio drive from shaft 28 to shaft 39 by reason of the automatic braking of annulus gear 56 by the reaction overrunning device 70. However, if desired, either of motors 93 or 134 may be operated with the sleeve 151 shifted rearwardly to effect a reverse drive through the second speed ratio planetary gearing or through the direct drive between shafts 28 and 39.

A variety of controlling means may be arranged to control pressure fluid supply to motors 93 and 134 and to shift sleeve 151. In the present embodiment of our invention we have arranged a system of valving means for selectively distributing the pressure fluid from pump 149 to the motors, the valving means in this instance and also the shift sleeve 151 being controlled selectively by the motor vehicle operator or driver.

Referring particularly to Figs. 1 to 3, we have arranged the driver operated controls within convenient reach adjacent the usual vehicle steering wheel 161 which is mounted on the customary post 162. Secured to this post is a fixed plate 163 having the right and left hand sectors 164 and 165 respectively. Extending parallel along post 162 and adjacent thereto are a pair of rotatable shafts 166 and 167 respectively projecting upwardly through sectors 164 and 165, these shafts having fixed thereto the laterally and oppositely projecting selector levers or elements 168 and 169 respectively. Each selector element may be readily moved about the axis of the shaft to which it is connected so that these shafts 166 and 167 may be selectively rotated.

Levers 168 and 169 are illustrated in their neutral positions, sector 165 bearing indicia "R" and "F" to indicate predetermined stations of shift for the lever 169 to move sleeve 151 from neutral (as in Fig. 4) to obtain either a reverse drive (by shifting sleeve 151 rearwardly) or a forward drive (by shifting sleeve 151 forwardly). Lever 169 is suitably operably connected to sleeve 151 and, as illustrated, rod 167 carries a lever 170 at its lower end, this lever actuating a Bowden wire mechanism 171 for operating a lever 172 mounted on rock shaft 173 which extends into casing 34 to shift sleeve 151 at the groove 152. Any suitable connection may be employed such as the customary yoke 174 swivelled to diametrically opposite blocks 175 fitting in the groove 152.

The sector 164 likewise has station indicia "2" and "3" for a selective setting of lever 168 for a second or third speed ratio drive through transmission 21. Shaft 166 also carries a lever 180 operating a Bowden wire mechanism 181 which leads to the distributor valving means 182.

The valving means 182 comprises a casing 183 sealed at its forward end by the closure means 184 through which the Bowden wire extends for connection to the reciprocatory valve 185 slidable in a sleeve 186 fixed within casing 182. The valve 185 has cylindrical heads 187, 188 fitting sleeve 186 and an intermediate annular groove 189 for distributing pressure fluid to the aforesaid pipes 131 and 132.

Sleeve 186 has a series of ports 190, 191 and 192 respectively communicating with annular passages 193, 194 and 195 formed in casing 183, these annular passages respectively communicating with pipes 196, 132 and 131. The pipe 196 supplies pressure fluid from the aforesaid pump delivery 159$^m$ to passage 193 and ports 190. With valve 185 positioned for neutral, as in Fig. 3, the pressure fluid is trapped in sleeve 186 between heads 187, 188.

When selector lever 168 is moved rearwardly to station "2" for drive in the second speed ratio, valve 185 is moved rearwardly to position head 188 beyond ports 191, ports 190 still being open to groove 189. Pressure fluid then passes from groove 189 through ports 191 to pipe 132 for operating the second speed motor 93.

When selector lever 168 is moved forwardly to station "3" for drive in the third speed ratio, valve 185 is moved forwardly to open ports 190 with ports 192 and thereby supply pressure fluid to pipe 131 for operating the third speed motor 134. Casing 183 has a return 197 for venting pipe 132 and motor 93 whenever the valve 185 occupies a position other than that for supply of pressure fluid to pipe 132. Likewise a vent 198 is provided for pipe 131 and motor 134.

In starting the vehicle from a standstill, the driver disengages the main clutch 22 by depressing pedal 30 and then he pushes lever 169 forwardly away from himself to the station "F" thereby shifting sleeve 151 to the forward drive position clutch shaft 39 directly with shaft 44. The clutch 22 is then engaged and the transmission low speed drive is effected. Lever 169 is then left at station "F" and lever 168 is moved to station "2" or directly to station "3" as may be desired without requiring operation of the main clutch 22.

If desired, the driver may start up in second or third by a corresponding shift of lever 168 followed by a shift of lever 169 to station "F" with the main clutch 22 released during shift of lever 169. When the vehicle is driving in third, lever 168 may be shifted to station "2" or to neutral to respectively effect a shift down drive to second or low.

It is only necessary to disengage the main clutch 22 when effecting a clutching shift of sleeve 151 for establishing a forward or reverse drive and, of course, when making a stop with lever 169 set at "F" to avoid stalling the engine 20.

For driving in reverse, the lever 169 is shifted to "R" to clutch sleeve 151 with teeth 156 to gear 150, the main clutch 22 being momentarily disengaged to accommodate this shift. This will effect a reverse drive through the low speed ratio planetary gearing and to obtain a faster drive in reverse, the lever 169 may be left at "R" and lever 168 moved to "2" or "3." Alternatively lever 168 may first be moved to "2" or "3" and then, with clutch 22 disengaged, lever 169 may be moved to "R" to obtain a reverse drive faster than provided by the low speed ratio.

In view of the arrangement of drivingly connecting pump 149 with the driven shaft, when shifter 151 is clutched with teeth 155 for a forward drive, and since the low speed ratio is provided independently of the pump 149 as a drive with shifter 151 so set, our transmission system provides for automatic step-up in the drive without the complication of mechanism usually attendant to automatic change speed devices.

Thus, for example, when the vehicle is driving and is then temporarily stopped, as for a red traffic light, the selector lever 168 is preferably shifted from the previous usual condition of third speed drive setting "3" to the second speed setting "2" or else left at "3," and the main clutch 21 released. Release of the main clutch is ordinarily preferred to shifting the shifter 151 to neutral, when the vehicle is momentarily stopped.

When the vehicle is thus stopped by applying the usual vehicle brakes, and with lever 168 moved from "3" to "2" by way of example, the pump 149 will no longer be driven and the pressure will immediately be relieved in the third speed conduit 131 because with lever moved from "3" to "2" the third speed motor 134 is, of course, vented through ports 192 and return 198 (see Fig. 3). The springs 108 at the third speed motor force the oil return. Furthermore, the pump delivery 159$^k$, 159$^m$, 196 (see Fig. 6) is also vented by back-flow through the stationary pump 149 as well as through vent 159$^t$ if valve 159$^s$ is set for fluid flow therethrough. However, even if lever 168 is shifted to "2" before the oil pressure drops at the delivery 159$^m$, the vehicle when stopped will cause the pump to stop operating and the second speed motor 93 will not continue any operation occasioned thereby because of the oil pressure drop back through the pump, through vent 159$^t$ or both. The springs 102 at the second speed motor force the oil return. Therefore, in the foregoing example, when the vehicle starts with the green light, the operator opens the engine throttle and the vehicle will start in low or 1st because, although lever 168 is set for second speed, it takes an appreciable running of the vehicle to cause the pump 149 to build up sufficient pressure to operate the second speed motor 98, especially since springs 102 must be overcome and the conduit system from the pump to the motor must be filled.

As soon as the second speed motor is operated to a certain degree less than fully operated, the sun gear 63 has its backward rotation retarded, but not checked entirely, and the speed ratio progressively and smoothly increases faster than the low speed ratio until, when slippage of the friction mats at brake 89 ceases, the sun gear 63 is fixed and the second speed ratio drive takes place. Then the operator selects third speed with lever 168 and the direct drive takes place as aforesaid. Thus, one shift has been eliminated viz., the shift from first to second, and the vehicle has been started in low gear ratio with automatic progressive step-up to second.

If the driver desires to increase or decrease the build-up of the pump pressure and thereby quicken or reduce the time of drive in low before the faster drive takes place, he has only to pull or push control 159$^w$ (see Fig. 1) to correspondingly screw the vent valve 159$^s$ (see Fig. 6) upwardly for greater oil escape or downwardly for less or no oil escape through vent 159$^t$. Also, varying oil viscosities as in winter start-up may be readily compensated for by this escape vent control and the varying desires of different drivers easily accommodated without attempt to hold the pump leakage to a predetermined compromising degree.

If, in the foregoing illustration, the lever 168 is left at "3" when making the stop, then as before the pump 149 loses its pressure on stopping and motor 134 returns to its position of release of clutch 104 under the influence of springs 108. The oil pressure in the third speed line escapes back through the pump, or vent 159ᵗ, or both. In starting the vehicle, the drive takes place in low, as before, and as the pump builds up pressure the clutch 134 gradually engages while slipping to gradually and progressively retard sun gear 63 from backward rotation and then forwardly rotating the sun gear 63 until it drives with the driving shaft 28. Thus the transmission progressively increases its drive from low to second to direct. As before, the pump pressure build up is determined by the pump efficiency, the capacity of the conducting system from pump to motor, the force of the motor-return springs, and the variable setting of valve 159ˢ when employed.

The motors 93 and 104 and their respective brake 89 and clutch 104 are preferably balanced in the sense that the torque through each is accommodated by the same pressure of the fluid. Thus, while motor 93 for checking the second speed reaction at sun gear 63 requires more force application than is required for clutch 104, the brake 89 has its friction plates at a more favorable force arm or distance from the common axis of rotation in comparison with the force arm of the third speed clutch friction plates. The desired balance, to avoid harshness of operation and undue slippage, is primarily compensated for by the varying areas of pistons 95 and 123.

Referring now to the embodiment of our invention illustrated in Figs. 8 to 9B, the transmission 21ᵃ is identical with transmission 21 from driven shaft 24 forwardly up to the spider 75. Therefore, we have not duplicated the Fig. 4 showing in its entirety and similar reference characters in Figs. 4 and 8 represent parts of the same structure.

In Fig. 8 the second speed sun gear 63ᵃ is, as before, loose on the driving shaft 28 but is now connected to its spider 75ᵃ by an intermediate cylinder or sleeve 200 coaxial with shaft 28. The inner surface of cylinder 200 is cylindrically formed at 201 to provide the outer member of an overrunning clutch 202 and is engaged by clutching rollers 203 spaced by cage 204. The cam member 205 of clutch 202 is splined at 206 to shaft 28. The clutch 202 allows cam 205 to run forwardly faster than cylinder 200 but rollers 203 will wedge to prevent cylinder 200 from rotating forwardly faster than cam 205.

The outer surface 207 of cylinder 200 is cammed to provide the inner member of another overrunning control or braking device 208 whose outer cylindrical member 209 carries a spider 210. Rollers 211 spaced by cage 212 are wedged to prevent backward rotation of cylinder 200 (opposite to arrow 213) faster than backward rotation of member 209 but rollers 211 freely permit forward rotation of cylinder 200 faster than forward rotation of member 209. The member 209 is centered in a cylindrical sleeve 214 yieldingly located in opening 215 of the transmission casing wall 216 by the annular rubber bushing 217 preferably secured by well known commercial processes to the wall 216 and sleeve 214. This rubber bushing relieves any eccentric loading by compensating for any minor misalignments of the associated parts therewithin and also serves to dampen vibrations and shocks of the transmission parts.

In Fig. 8 the spider 210 carries the drum 76ᵃ and the motor 93 actuates the braking device 89 to hold drum 76ᵃ against rotation just as for drum 76 in Fig. 4. Likewise spider 75ᵃ is formed with a drum 218 adapted for clutching with shaft 28 by motor 134 and clutch 104 similar to the clutching of drum 76 in Fig. 4.

The control for the Fig. 8 transmission is illustrated in Figs. 9A and 9B wherein the same levers 168 and 169 are connected as before to Bowden wire mechanisms 181 and 171 respectively leading to the distributor valve 185ᵃ and to the forward and reverse shift sleeve 151. In Fig. 9A the plate 163ᵃ has a sector 165ᵃ identical to sector 165 of Fig. 2 and a right hand sector 164ᵃ which differs slightly from sector 164. In Fig. 9A lever 168 moves from the illustrated neutral position forwardly to successively occupy stations "2" and "3" in effecting the second and third speed ratio drives through the transmission.

In Fig. 9B the valve casing 183ᵃ has the annular grooves 193ᵃ, 194ᵃ, 195ᵃ and 197ᵃ which respectively communicate with pressure fluid supply pipe 196, pipe 132 leading to the second speed motor 93, pipe 131 leading to the third speed motor 134, and pipe 219 which leads to the oil sump or reservoir. The fixed sleeve 186ᵃ has ports 190ᵃ, 191ᵃ 192ᵃ and 220 respectively communicating with grooves 193ᵃ, 194ᵃ, 195ᵃ and 197ᵃ.

The valve 185ᵃ has the annular groove 189ᵃ between heads 187ᵃ and 188ᵃ which are spaced to maintain pressure fluid inlet port 190ᵃ in communication with valve groove 189ᵃ during successive forward positioning of the valve to open ports 191ᵃ and 192ᵃ with valve groove 189ᵃ. Thus, when selector lever 168 is moved to station "2" valve 185ᵃ is moved to position head 187ᵃ at dotted line position 221 to supply pressure fluid to pipe 132, and when lever 168 is moved to station "3" the head 187ᵃ occupies dotted position 222 to supply pressure fluid to pipe 131. Port 220 vents either or both of pipes 131, 132 when not supplied with pressure fluid. It will be observed that when pressure fluid is supplied to the third speed supply pipe 131, pressure fluid is also supplied to the second speed pipe 132.

In the operation of the transmission of Figs. 8 to 9B, selector lever 169 is manipulated for forward or reverse drives just as with the Fig. 1 embodiment. With lever 168 in neutral, shifting lever 169 to "F" or "R," with attendant momentary release of the main clutch 22, provides either a forward or reverse drive of the driven shaft 24 through the low speed planetary gear train by reason of the automatic holding of annulus gear 56 by the reaction thereof at the overrunning device 70.

This Fig. 8 low speed drive, obtained by moving lever 169 to "F," has the following different characteristics over the Fig. 4 low speed drive conditions. In Fig. 8 there is no free-wheeling as in Fig. 4 because the drive shaft 28 cannot drop below the speed of the driven shaft 44. Thus, with the vehicle driving the engine, any tendency of the driven shaft to overrun the driving shaft causes the annulus gear 56 to overdrive, this in turn acting through planet gears 62 to tend to overdrive the sun gear 63ᵃ which however is prevented by clutch 202 locking the sun gear with the drive shaft 28. This is of great advantage in providing smooth and quick shifting because the engine, with lever 169 set at "F," is never accelerated from idle up to the second or third speed drives; also the engine cannot stall, and further, a dead engine may be started by towing the vehicle without requiring a build-up pressure at pump 149. In changing speeds from third to second or low, or from second to low, the engine never speeds up more than the ratio of the change and the vehicle cannot be jolted or lurched because the engine cannot drop below the speed of the driven shaft.

With selector lever 169 remaining in its "F" position for forward vehicle drive, the driver may obtain the second speed drive by shifting selector lever 168 from the neutral position to position "2." This advances distributor valve 185a to supply pressure fluid from supply pipe 196 to pipe 132 to cause motor 93 to engage brake 89 and thereby hold cylinder 209 against rotation.

Sun gear 63a tends to drive backward and by holding cylinder 209 fixed this backward or reaction rotation of sun gear 63a is prevented because overrunning device 208 acts to wedge rollers 211 as soon as cylinder 200 tends to rotate backward with cylinder 209 held. When sun gear 63a is thus held, a compound second speed ratio drive is obtained just as in Fig. 4. During the second speed drive, the clutch 104 is released so that with cylinder 200 held against rotation, the overrunning clutch 202 is free because its rollers 203 are not wedged by this action.

In the second speed setting, when the vehicle tends to overrun the engine, the engine or speed of the driving shaft 28 is permitted to drop down only to the speed of the driven shafts 44, 24. Under such conditions sun gear 63a and its cylinder 200 rotate forwardly freely away from rollers 211 (while cylinder 209 is held by brake 89) until, when the second speed ratio is overcome by sun gear 63a reaching the speed of driving shaft 28, this sun gear by its cylinder 200 then wedges rollers 203 to lock this sun gear with the driving shaft. The engine is therefore utilized as a brake in second speed by a direct drive from shaft 24 to shaft 28. When the engine is again speeded up, clutch 202 is released, the tendency of backward rotation of sun gear 63a is prevented by device 208, and the second speed ratio drive to shaft 44 is again obtained through the compounding of the first and second planetary gear trains as aforesaid.

The provision of the arrangement whereby, when coasting in second speed setting, the engine cannot drop down in speed below the speed of the driven shaft is especially beneficial in a shift down from third speed. If such a shift down is made during coasting, then there is no jolt because shafts 28 and 44 are synchronized both before and after the shift down. If such shift down is made while accelerating, with the engine driving the vehicle, then the drive shaft 28 merely accelerates by the amount of the second speed ratio gearing to smoothly and quickly pick up the driven shaft 44.

When third or direct is selected from the position "2," by shifting selector to position "3," the valve 185a moves from the dotted position 221 for second speed to the dotted position 222 (see Fig. 9B) so that pressure fluid is simultaneously supplied to pipes 132 and 131. Thus, without interrupting the previously engaged condition of the second speed brake 89, the clutch 104 is engaged so that there is no dwell in the driving continuity and no driving time lost in making the shift either in changing up from second to third or in changing down from third to second.

When the direct control clutch 104 is engaged, shaft 28 is directly clutched with sun gear 63a and the two gear trains lock-up and revolve as a unit with shafts 28 and 44. Clutch 202 has no action because cam 205 and cylinder 200 rotated together by the clutching of the shaft 28 with spider 75a. Cylinder 200 rotates freely forwardly and cylinder 209 is held by brake 89. There is no free-wheeling action in the third speed drive setting.

In shifting selector lever 168 from "2" to "3," the driver may simultaneously let up on the usual accelerator pedal to decelerate drive shaft 28 and thereby synchronize sun gear 63a with shaft 28 by an automatic synchronous locking of clutch 202 equivalent to vehicle coasting in second speed as aforesaid. This will synchronize the clutching parts of clutch 104 and thereby reduce clutch wear, it being again pointed out that the arrangement at clutch 202 prevents sun gear 63a from dropping below the speed of shaft 28 while in the second speed setting.

While driving in the third speed ratio setting, our arrangement provides a fast shift down from third to second. Thus, if while the vehicle is being driven by the engine, the driver desires faster vehicle acceleration or power to quickly pass another vehicle or to climb a grade for example, lever 168 is shifted from "3" to "2" and the direct clutch 104 is released by motor 134 being vented through pipe 131 and return pipe 219 at ports 220 and valve casing groove 197a. However, the second speed brake 89 maintains its engaged condition and the natural action of the driver maintaining the engine throttle valve open causes the engine (which is suddenly unloaded by disengagement of clutch 104) to race or speed up until checked by rollers 211 wedging and preventing backward rotation of cylinder 200 and sun gear 63a. When driving in third this sun gear rotates forwardly at the speed of driving shaft 28 and during acceleration of the driving shaft on a shift down change to second speed, the sun gear 63a and cylinder 200 rapidly decelerate to zero rotation and then device 208 locks these parts to prevent reaction or backward rotation. The drive in second is therefore synchronously established and cannot take place until the second speed driving ratio is established between shafts 28 and 44.

We desire to point out that during the direct or third speed ratio drive, which constitutes the major portion of the driving condition of the transmission, there is no rubbing of the parts of the second speed clutch 89 which would cause wear of the friction mats and generate heat; clutch 89 is engaged during the third speed drive.

The clutch 202 is incorporated, rather than omitted, in order to insure against free wheeling of the vehicle in low speed and to facilitate speed changes and obtain other characteristics attendant thereto as aforesaid.

Because of the arrangement whereby, in shifting to third, the driving shaft 28 cannot drop below the speed of the driven shaft, the clutching parts of the direct clutch 104 are automatically synchronized and the direct clutch could be of the positive jaw type, such as the well known Maybach clutch.

In the Fig. 8 arrangement, when lever 169 is set at "F" for the forward drive, the engine or shaft 28 can never drop below the speed of the driven shafts 44 and 24 so that there is never any free-wheeling in the sense of the driven shaft overrunning the driving shaft. The driven shaft picks up the engine in direct when the vehicle drives in the low speed setting and the vehicle also drives the engine in direct when in the second and third speed settings.

In this Fig. 8 arrangement, the vehicle may be started by automatic progressive shifts much as in Fig. 4 but with certain further advantages of a progressive shift from low to third without as much wear on the third speed clutch as in Fig. 4. Thus, when stopping the vehicle, the lever 168 is preferably left in its normal condition of direct drive at "3," and the pump 149 will stop and the pressure will drop in the third speed oil supply line just as before. However, on starting in the low speed, the oil pressure, on building up as before, now is supplied to both of the motors 93 and 134 so that the progressive build-up in speed passes through second to high assisted by the second speed brake 89. Therefore, the Fig. 8 arrangement is preferred for a start in a direct setting. Of course, with the Fig. 8 device, the lever 168 may be shifted from "3" to "2" when making a stop and the vehicle will be accelerated as in Fig. 4 under such conditions because, in such event, only motor 93 is open to the pump. In any event the driver may of course shift lever 168 to neutral and drive in low indefinitely, as desired, irrespective of the pump pressure build-up.

Referring to the modification of our invention illustrated in Figs. 10 and 11, we have modified the transmission of Figs. 8 to 9B by incorporated means for using the engine as a brake by driving the engine through the second speed gear train, while in the second speed setting, instead of braking the engine in a direct drive as in Fig. 8. Such an arrangement is possible with the Fig. 8 transmission and is desirable in hilly country by affording a more efficient engine brake by reason of the vehicle driving the engine faster than direct by the amount of the second speed ratio.

In Figs. 10 and 11, the various speed ratio drives are obtained and the parts function just as in Fig. 8 although for installation and manufacturing convenience certain of these parts are rearranged without, however, altering their functions. Thus, in Fig. 11 the transmission 21$^b$ has its sun gear 63$^a$ formed as in Fig. 8 although now the drum 218 has a forwardly extending frustoconical annular braking member 225 engageable by the friction mat 226 carried by the companion annular braking member 227 carried by the annular piston 228 of a further pressure fluid operated motor 229 for the braking device 230 thus formed.

The motor 229 comprises a cylinder 231 formed in the transmission front cover 32$^b$ and providing an annular pressure chamber 232 supplied with pressure fluid through a suitable conduit 233 in cover 32$^b$, this conduit communicating with a supply of pressure fluid which may be independent of the pump 149. Thus conduit 233 is, in the present embodiment, supplied with pressure fluid by a pipe 234 which leads forwardly to a manually operable pump 235 comprising a cylinder 236 and a piston 237 operable by a rod 238 connected at 239 to a lever 240 which has a foot engaging pedal portion 241 disposed for convenient operation by the driver as just to the right of the usual accelerator pedal so that in applying this pedal 241 the accelerator pedal is released. Fluid, such as oil, is stored at reservoir 242, the reservoir communicating with the cylinder by a port 243. When the operator depresses pedal 241, piston 237 is pushed forwardly to supply pressure fluid to the pressure chamber 232 to operate motor 229, a spring 244 restoring pedal 241 after the desired operation.

Piston 228 carries an annular abutment 245 engaging the splines 246 of the fixed casing 31$^b$ so that the piston may reciprocate axially but not rotate. A series of springs, one being shown at 247 yieldingly urge piston 228 forwardly to disengage the braking device 230.

For convenience the second speed motor 93$^b$ is arranged above the transverse wall 216 although this motor operates its second speed braking device 89$^b$ just as in the case of the motor 93 and brake 89 of Fig. 8. In Fig. 11 the motor 93$^b$ is supplied with the second speed pressure fluid pipe 132 (from valve 185$^a$ as in Fig. 9B) although in this instance the pipe directly opens to the annular pressure chamber 98$^b$ for annular piston 95$^b$.

The piston 95$^b$ is splined, as before, to the internal splines 81$^b$ of casing 31$^b$ and these splines are interrupted to accommodate an abutment ring 248 which anchors an abutment plate 249. This plate anchors the rear end of springs 247 and affords an abutment for packing the friction mats and plates of brake 89$^b$ when piston 95$^b$ is forced forwardly by pressure fluid introduced to chamber 98$^b$ from pipe 132. The direct clutch 104 and motor 134 are just as provided in Fig. 8 with the following exception.

In Fig. 11 the cam member 205$^b$ of clutch 202 is formed integrally with the spring cage 106$^b$ instead of separately. Since the cam member and spring cage are both splined to the driving shaft 28, this form of integral construction may be readily employed.

The Fig. 11 transmission is controlled and the speed ratios and parts function identically as set forth for Fig. 8 with the following differences. In Fig. 11, whenever the transmission is set for second speed ratio drive the driver may operate pedal 241 to actuate pump 235 for supplying pressure fluid to the motor 229 to thereby engage brake 230 for holding cylinder 200 against forward rotation. Backward rotation of cylinder 200 is, as aforesaid, prevented by device 208 (cylinder 209 being held by brake 89$^b$ when in second speed) so that if motor 229 is operated when the engine is driving the car then brake 230 engages without relative slipping.

Usually, the motor 229 will be operated during a down hill coast to obtain more efficient engine braking than would otherwise be afforded through a direct drive with cylinder 200 rotating forwardly with shaft 28 by a locking action at clutch 202. When the motor 229 is thus operated, the brake 230 will slow down and hold the cylinder 200 and sun gear 63$^a$ from rotation thereby establishing the second speed compounded ratio of the first and second planetary trains as a two way drive giving a speed-up action when the vehicle drives the engine. If desired the same pressure fluid system from pump 149 may be utilized for supply to motor 229 under control of any suitable valving means in lieu of the manual pumping system illustrated in Fig. 10.

While it is intended that the motor 229 be operated only during a second speed setting of the transmission, the arrangement is fool-proof in the event of accidental operation at other times. Thus, if motor 229 is operated when in third, the brake 230 provides an auxiliary brake on the vehicle momentum; if operated when in low, the drive would thereby change to second independently of the setting of selector lever 168 of Fig. 9A.

In Fig. 12 the arrangement is identical with that illustrated in Fig. 8 except as to the mounting of the second speed brake spider, and the type of overrunning device within this spider. This spider 250, in Fig. 12, has inwardly projecting circumferentially spaced tongues 251 radially overlapping corresponding outwardly extending tongues 252 carried by cylinder 209ᵃ which in this instance is externally cammed at 253 for the rollers 211 while cylinder 200ᵃ is externally cylindrical at rollers 211. However this overrunning device 208ᵃ functions identically to device 208 of Fig. 8. The spider 250 and tongues 251 provide an abutment for the reaction rotational tendency of cylinder 209ᵃ.

An insert 254 of yielding material, such as any suitable commercial rubber compound, mounts spider 250 on cylinder 209ᵃ, this insert filling the spaces between tongues 251 and 252 and entirely insulating the spider from the cylinder. The forward end portion of cylinder 209ᵃ, beyond the cams 253, is internally cylindrical for a journal on the bearing member 255 which is seated on cylinder 200ᵃ to center and journal spider 250 on cylinder 200ᵃ especially at such times as when the rollers 211 are not wedged. The bearing member 255 has an outwardly extending spacer flange 256, the yielding insert 254 being extended at 257 outwardly behind flange 256 and thereabove.

This arrangement not only compensates for any misalignment or eccentric positioning of the parts (as for bushing 217 in Fig. 8) but provides improved vibration damping properties on the parts operably connected to insert 254 and also smoothes the action of device 208ᵃ and brake 89.

The operation of the transmission in Fig. 12 is identical with that of Fig. 8 and will therefore will not be repeated.

Referring to Fig. 14 we have illustrated a modified arrangement for conducting the pressure fluid to the direct motor, such arrangement being applicable to any of the transmissions of Figs. 4, 8, 11 or 12 as will be readily apparent. By way of example and for convenience of reference, the Fig. 14 arrangement is adapted to be substituted for the third speed motor intake arrangement of Figs. 4, 8 or 12.

In Fig. 14 the pressure fluid, as before, enters the annular inlet port 129 formed in the fixed conductor member 260 which has the axially extending annular chamber 261 formed therein and open at the rear end to slidably receive the annular piston 262. This piston carries outwardly expanding sealing rings 263 engaging the outer wall of chamber 261 and member 260 has the expanding rings 264 engaging the inner wall of piston 262, thereby sealing the piston against escape of oil along the walls of chamber 261. The piston does not rotate and has a plurality of circumferentially spaced passages 265 for conducting the pressure fluid rearwardly from inlet port 129. A light spring 266 urges piston 262 rearwardly to prevent the piston from ramming rearwardly by the pressure fluid and to prevent undesired forward displacement of the piston when the vehicle is suddenly stopped.

The third speed cylinder 267 is fixed to the driving shaft by splined connection 268 and slidably receives the third speed piston 269 which operates the third speed clutch 104 just as previously described. Cylinder 267 is formed with an annular groove 270 open to passages 265, and passages 271 leading the oil to the pressure chamber 272 to operate piston 269. Adjacent groove 270 the cylinder has annular projections 273, 274 which run against the rear face of piston 262 and provide a self-lapping seal, the piston 262 being urged rearwardly against these projections to follow-up for any wear and compensate for manufacturing inaccuracies. By reason of the groove 270 being of less area at piston 262 than the area at the front face of this piston, the piston is subjected to a differential pressure and is partially unloaded from the rearward thrust occasioned by oil pressure entering the chamber 261 at port 129. We have thus provided a balancing off means by utilizing the pressure reaction on the annular piston 262 which forms a seal and inlet conductor between the intake 129 and the main pressure chamber 272.

Referring now to Fig. 15 we have illustrated a modified arrangement of the forward and reverse drive mechanism 275 which is intended to be substituted for the aforesaid corresponding mechanism 33 in any of the foregoing transmission arrangements. The function of mechanism 275 and control thereof is identical with that described in connection with mechanism 33 but mechanism 275 dispenses with the countershaft gearing and provides a novel and improved form of planetary gearing for the reverse drive.

In Fig. 15 the carrier 52 has its hub 54 splined as before to the intermediate driven shaft 276 which, in this instance, has its rear end piloted in the driven shaft 277. Shafts 276 and 277 respectively correspond in function to shafts 39 and 44 for the mechanism 33. Secured at 278 to the fixed housing part 279 (which forms the outer member of the same low speed reaction device 70) is a fixed bracket 280 which mounts bearing 281 for shaft 276. This bracket has the fixed clutch teeth 282 adapted for clutching on forward shifting of the forward and reverse control shifting sleeve 283 which now takes the place of sleeve 151 in the mechanism 33.

Sleeve 283 is slidably splined at 284 with hub 285 which, in turn, is splined to the cylindrical hub 286 of carrier 287 for planetary pinions 288, the hub 286 being rotatably journalled on shaft 276. Clutch teeth 289, are carried by member 289ᵃ and are engageable with shifter 283 on rearward clutching shift of the latter, the part 289ᵃ being connected to annulus gear 290 which is a forward cylindrical extension of shaft 277; this annulus gear meshing with planet pinions 288. The sun gear 291 of the reversing planetary train is splined on shaft 276.

Since shifter 283 now clutches rearwardly at teeth 289 for a forward drive, and forwardly at teeth 282 for a reverse drive (from shaft 276 to shaft 277) we have extended the shift lever 172 for Bowden wire 171 upwardly from the rock shaft (see Fig. 16) instead of downwardly in the preceding embodiments so that the same Bowden wire 172 may be employed and operated just as before.

Thus when the Bowden wire 172 is pulled forwardly by the lever 169 of Fig. 2 or Fig. 9A, the shifter 283 clutches rearwardly at teeth 289 to lock up the reversing planetary gearing for a direct drive from shaft 276 to shaft 277. The gearing is locked since the carrier 287 is locked to part 289ᵃ and annulus gear 290, while shaft 276 drives sun gear 291 for a direct drive to annulus gear 290 and shaft 277.

When the Bowden wire 172 is pushed rearwardly, by the lever 169 of Fig. 2 or Fig. 9A, the shift clutch 283 clutches forwardly at teeth 282 to hold carrier 287 against rotation. The forward rotation of shaft 276 and sun gear 291 thereby drives planet pinions 288 on their fixed axes to rotate the annulus gear 290 and shaft 277 backwards for the reverse drive of the vehicle.

The pump 149, just as in the preceding embodiments, is preferably driven from a driven shaft so that the control system will operate as aforesaid. Thus, shaft 277 has the spiral gear 292 driving the gear 293 for operating pump 149 just as in Fig. 6. Since shaft 276 always receives a forward drive independently of the pressure fluid control system, and since a vehicle is ordinarily not driven very long in reverse, the pump 149 will function properly as driven in Fig. 15 although obviously during the reverse drive the pump is driven backwards and will not deliver lubricating oil as at 159r in Fig. 6 or oil pressure at outlet 159m. If desired another pumping system for lubricating purposes may be used, driven from the engine or any part driven therefrom during forward and reverse drives as is customary in transmission practice.

Referring now to the transmission of Fig. 17 we have illustrated a mechanism which, in principle, is substantially the same as the Fig. 8 transmission by way of example although the Fig. 17 arrangement has the gearing "turned end-for-end" and has certain advantages of simplification and a very advantageous reverse drive arrangement.

In Fig. 17 the main drive shaft 294 drives the primary sun gear 295 meshing with planet pinions 296 of the first gear train. Pinions 296 are carried by the carrier 297 splined to the intermediate driven shaft 298 which is adapted to drive shaft 299 forwardly or in reverse as before. Annulus 300, meshing with pinions 296, now extends rearwardly to drive carrier 301 of the planet pinions 302 of the second gear train which further comprises annulus gear 303 and sun 304. Annulus gear 303 is a part of carrier 297 and sun gear 304 is loose on shaft 298 and while free to rotate forwardly is prevented from backwards rotation when the second speed brake is applied, by the braking device in the form of overrunning device 305 which functions identically with the device 208 aforesaid. Thus the outer member 306 of device 305 is carried by spider 1307 adapted to be held by the second speed brake 307 actuated by motor 308 just as motor 93 actuates brake 89 of Fig. 8.

Annulus gear 300 has a spider 309 connected thereto forwardly of the first speed planetary gear set, this spider having a hub 310 loosely journalled on shaft 294, the overrunning clutch 311 being disposed between this hub and shaft to prevent hub 310 from rotating forwardly faster than shaft 294. Clutch 311 has functions corresponding to clutch 202 of Fig. 8. Splined to hub 310 is the hub part 312 of spider 313 carrying the drum 314 of the direct clutch 315 identical in function with clutch 104 of Fig. 8. The drive for clutch 315 comprises the hub 316 splined to shaft 294, the clutch being applied by the third speed motor 317 which is controlled just like motor 134 of Fig. 8.

Surrounding hub 312 is the reaction type overrunning device 318 which is identical with the device 70 of Fig. 8, the outer member 319 being fixed to the wall 320 of casing 321.

The outer member 306 of device 305 is journalled at 322 in the transmission casing and extends rearwardly to provide the sun gear 323 of the reverse gear train, this sun being loosely journalled on shaft 298. Meshing with this sun gear are the planet pinions 324 also meshed with the stationary annulus gear 325 fixed to the casing. The carrier 326 has internal clutch teeth 327 engageable with external teeth 328 of shiftable clutch member 329, the latter having internal teeth 330 adapted, on rearward shift of member 329, to clutch with teeth 331 carried by shaft 298. Shifter 329 is splined at 332 with driven shaft 299. Since shifter 329 moves rearwardly for the forward drive from shaft 298 to shaft 299, and forwardly for the reverse drive, just as in Fig. 15 for shifter 283, we employ the Fig. 16 arrangement for shifting the clutch member 329 so that the Fig. 2 or 9A (preferably the latter) selector controls may be employed. In Fig. 17 the pump 149 is driven just as in Fig. 15 as indicated by the similar parts.

In operation, the Fig. 17 transmission functions just as described for Fig. 8. Reference is made to Fig. 8 instead of Fig. 4 since, while the Fig. 17 arrangement will accommodate the control system for Fig. 4, the arrangement will also accommodate the Fig. 8 control system because the second speed motor 308 may remain in operation when the third speed motor 317 is operated during the direct drive.

The low speed or first is selected as for the Fig. 8 transmission, the drive in Fig. 17 passing from sun gear 295 to pinions 296 and thence through carrier 297 to shaft 298, clutch teeth 331, 330; thence by shifter 329 to driven shaft 299, the annulus gear 300 being held from backward rotation by the reaction braking means at the device 318. Here again, the driving shaft 294 cannot drop below the speed of the driven shaft 299 because of clutch device 311 which locks on any such tendency during overrun in first and second. This device 311 also provides for starting a dead engine by towing the vehicle, with shifter 329 shifted rearwardly for a forward drive, independently of the pump pressure system. The device 311 has further desirable functions just as hereinbefore set forth in connection with the corresponding device 202 of Fig. 8.

In the second speed drive setting, backward rotational tendency of the second speed sun gear 304 is checked by the device 305 since cylinder 306 is then held by the operation of the second speed motor 308 and brake device 307, the resulting drive being compounded through the first two planetary gear trains just as in Fig. 8.

In the direct drive, motor 317 is operated to engage clutch 315 while the second speed motor 308 remains engaged (as for Fig. 8) and the direct drive is obtained since annulus gear 300 is in effect clutched to sun gear 295 to lock the first two gear trains.

For reverse, shifter 329 is positioned forwardly to clutch teeth 328 with teeth 327. The drive then passes from sun gear 295 to pinions 296, the reaction on annulus gear 300 causing device 318 to prevent backward rotation of this annulus gear as well as carrier 301. Therefore carrier 297 drives forwardly at a reduction speed making sun gear 304 drive backward thereby effecting engagement of the rollers of device 305 to drive spider 307 and reversing sun gear 323 backwards, the brake 307 being released. Now since annulus gear 325 is fixed to the casing, backward drive of sun gear 323 drives carrier 326 backwards through a further reduction, this reverse drive passing through shifter 329 to driven shaft 299. The reverse is very favorable since the arrangement readily accommodates any size reverse gears as may be desired with corresponding variation in the reversing ratio.

During the second and third speed drives, brake 308 is engaged thereby holding sun gear 323 whereby the reversing gear train is locked. This is an advantage of quietness, less noise in the gearing, and minimization of thrusts where helical gearing is employed. In the low speed drive sun gear 323 drives backwards caused by backward rotation of sun gear 304 locking the device 305. In Fig. 17 the natural tendency of sun gear 304 to drive backwards in low gear is utilized to obtain the reverse drive.

The transmission of Fig. 17 is preferably controlled just as for the Fig. 8 transmission, including the aforesaid automatic change of speed ratios by the pressure fluid build-up on starting the vehicle, the only difference being similar to that aforesaid in connection with Fig. 15, viz., where pump 149 is used for lubricant pressure delivery as well as for operation of motors 308 and 317, lubricant is not delivered during a reverse drive because of the pump being driven by the reversing driven shaft.

In Fig. 18 we have illustrated a countershaft reverse drive for the Fig. 17 arrangement which employs planetary gearing; also a forward and reversing shift clutch which is identical to the Fig. 4 shift clutch. In Fig. 18 reverse is obtained through countershaft gearing which does not require the reverse idler gear 141 of Fig. 6 since, as in Fig. 17, the natural tendency of the second speed sun to go backwards is utilized for the reverse drive through the countershaft reduction train.

In Fig. 18 all parts including and ahead of member 306, sun gear 304, controlling device 305 and shaft 294 are identical with the showing in Fig. 17 and for convenience, reference to such parts are made in Fig. 17 as Fig. 18 is partly in elevation to avoid duplication. In Fig. 18, the carrier 297 is splined to intermediate shaft 335 which rotates relative to driving shaft 294, driven shaft 336, sun gear 304, and the countershaft drive gear 337 which is formed as an extension of member 306 and which journals on shaft 335. The rear end portion of shaft 335 has forward drive clutch teeth 338 and an annulus 339 providing for synchromesh clutching, when used as in Fig. 4, and the outer member of an overrunning clutch 340 whose inner cam member 341 is splined on shaft 336. This clutch 340 is free for all forward drives but locks to pick up the engine from the vehicle so that the engine may be used as a brake or so that a dead engine may be started by towing the car even though the shift clutch 342 is set for neutral.

The shifting clutch 342 is operated identically to the Fig. 4 showing; also the pump 149 and countershaft drive is identical with Fig. 4. When clutch 342 is shifted rearwardly for reverse, it clutches with teeth 343 of gear 344. Countershaft 345 journals the reduction cluster gears 346 and 347 which are respectively in constant mesh with gears 337 and 344. Thus, there is no reverse idler gear between gears 347 and 344 as in Fig. 4 because in Fig. 18 we utilize the natural reversing tendency of the second speed sun gear 304 to drive gear 337 in reverse, it being noted that in the foregoing analysis of the Fig. 17 planetary gearing the second speed sun (with motors 308 and 317 released) revolves backwards locking control device 305 to rotate carrier 1307 backwards. In Fig. 18 this carrier 1307 is connected to gear 337 which therefore drives gear 334 in reverse.

The provision of the control device 340 insures a couple between shafts 336 and 294 so that even with shifter 342 in neutral the driven shaft 336 will pick up shaft 335 so that a dead engine may be started by towing the car and the engine is used as a brake during down hill coast with the shifter 342 in neutral. When shaft 335 is thus driven forwardly the control device 311, just as in connection with the corresponding device 202 in Fig. 8, locks to effect a direct drive to the engine. Thus, in Fig. 18, the engine can never drop below the speed of the driven shaft even when shifter 342 is set in neutral. In all forward driving speeds from the engine the device 340 runs free because the transmission gearing output at clutch teeth 338 and annulus 339 running forward never lags behind the forwardly driven shaft 336 and cam 341 carried thereby. During reverse the device 340 also runs free because carrier 297 drives forwardly with annulus 339, while shaft 336 is driven backwards in reverse. If desired the control device 340 may obviously be omitted.

In Fig. 18 the speed ratio drives through the main transmission are identical with the Fig. 17 arrangement and in Fig. 18 the pumping system and transmission control is identical with the Fig. 8 arrangement making repetition unnecessary.

Referring to Figs. 19 and 20 we have illustrated the Fig. 18 main transmission with modified types of reverse wherein the second reduction provided by the countershaft gearing of Fig. 18 is omitted and the driven shaft is clutched directly to either the second speed brake spider (Fig. 19) or directly to the second speed sun gear without driving through the reaction overrunning member at the second speed sun gear.

Thus in Fig. 19, the spider 350 instead of carrying the countershaft driving gear as in Fig. 18, now carries the reversing clutch teeth 351 engaged by teeth 352 when clutch 353 is shifted forward for reverse on the hub 354 fastened to the driven shaft 355. Here again the reversing tendency of the second speed sun gear 304 is utilized to drive through control device 305 to drive the vehicle in reverse. The forward drive is just as in Fig. 18, clutch 353 shifting rearwardly to engage the forwardly driving teeth 338. The pump drive is taken from gear 356 just as in Fig. 15.

In Fig. 20 the parts are identical to Fig. 19 except that the reversing clutch teeth 351 are carried with second speed sun gear 304, the second speed brake carrier 358 now terminating at the control device 305. Here again, we utilize the reversing tendency of the second speed sun gear to drive the vehicle in reverse without driving through control device 305.

In both Figs. 19 and 20 the clutch 353 is shifted as in Figs. 15 and 16 in order to maintain the same manual shift controls throughout, it being noted that in Figs. 19 and 20 the clutch 353 shifts forwardly for reverse and rearwardly for a forward drive. Also, in Figs. 19 and 20 the fluid pressure pump is driven from the shaft 356 which is reversed at times so that the pressure fluid system is similar to the Fig. 15 arrangement wherein the pump does not deliver oil pressure in the reverse drive. However, as in Fig. 15, the arrangement in Figs. 19 and 20 drives through the first speed gear ratio for the reverse drive independently of the oil pumping system. Except for the reversing arrangements, the transmissions of Figs. 19 and 20 are controlled and operated just as for the Fig. 8 and Fig. 18 transmissions.

We do not limit our invention, in the broader aspects thereof, to any particular combination and arrangement of parts such as shown and described for illustrative purposes since various modifications will be apparent from the teachings of our invention and scope thereof as defined in the appended claims.

We claim:

1. In a motor vehicle planetary gear transmission; a driving shaft adapted for forward driving rotation; a shaft adapted to be driven from said driving shaft; means including planetary gearing for driving said driven shaft from said driving shaft at two relatively different forward driving speed ratios, said planetary gearing having a pair of rotary control members; overrunning means operable automatically to prevent rotation of one of said control members in one direction for effecting the slower of said speed ratio drives; and speed ratio drive-controlling means operable to frictionally engage the other of said control members for effecting the faster of said speed ratio drives; a pressure fluid operated motor for power operation of said drive-controlling means; and means operating in response to predetermined speed of the driven shaft for supplying fluid under pressure to said motor; said overrunning means permitting rotation of the first said control member in a direction opposite to that aforesaid during said faster drive.

2. In a motor vehicle planetary gear transmission; a driving shaft adapted for forward driving rotation; a shaft adapted to be driven from said driving shaft; means including planetary gearing for driving said driven shaft from said driving shaft alternatively at two relatively different forward driving reduction speed ratios, said planetary gearing having a pair of rotary control members; overrunning means operating in response to rotational tendency of one of said control members in one direction to prevent such rotation of this control member to effect the slower of said reduction drives; braking means operable to arrest rotation of the other of said control members for effecting the faster of said reduction drives; a pressure fluid operated motor for power operation of said braking means; and means under control of the speed of the driven shaft for supplying fluid under pressure to said motor; said overrunning means releasing the first said control member for rotation in a direction opposite to that aforesaid during said faster drive.

3. In a motor vehicle planetary gear transmission; a driving shaft adapted for forward driving rotation; a shaft adapted to be driven from said driving shaft; means including planetary gearing for driving said driven shaft from said driving shaft alternatively at two relatively different forward driving speed ratios one being a reduction drive and the other being a direct drive; said planetary gearing having a pair of rotary control members; overrunning means operating in response to rotational tendency of one of said control members in one direction to prevent such rotation of this control member to effect the reduction drive; clutch means operable to drivingly connect the other of said control members with one of said shafts for effecting said direct drive; a pressure fluid operated motor for power operation of said clutch means; and means operating in response to predetermined speed of the driven shaft for supplying fluid under pressure to said motor; said overrunning means releasing the first said control member for rotation in a direction opposite to that aforesaid during said direct drive.

4. In a motor vehicle gear transmission; a driving shaft adapted to be driven in a forward driving direction of rotation; a shaft adapted to be driven from said driving shaft; means including gearing for driving the driven shaft from the driving shaft in said forward direction of rotation at a plurality of relatively different speed ratios; said gearing driving means including a plurality of rotatable control elements; overrunning braking means for automatically preventing rotation of one of said control elements in one direction to effect one of said speed ratio drives for driving the driven shaft; drive-controlling means engageable with another of said control elements for effecting another of said speed ratio drives for driving the driven shaft at a speed faster than that effected by said overrunning braking means; a pressure fluid motor for power operation of said drive-controlling means; and means operating in response to predetermined speed of the driven shaft for supplying fluid under pressure to said motor.

5. In a motor vehicle gear transmission; a driving shaft adapted for forward driving rotation; a shaft adapted to be driven from said driving shaft; means including gearing for driving said driven shaft from said driving shaft in three relatively different forward driving speed ratios, said gearing having a pair of rotary control elements; overrunning means operable automatically to prevent rotation of one of said control members in one direction for effecting the slowest of said three speed ratio drives; fluid pressure operating means operable to prevent rotation of the other of said control members for effecting another of said three speed ratio drives; fluid pressure operating clutch means operable to drivingly connect said other control member with one of said shafts for effecting the third of said three speed ratio drives; means operating in response to predetermined speed of the driven shaft for generating fluid under pressure, and vehicle driver operated means for controlling delivery of said fluid from said pressure fluid generating means to each of said pressure fluid operating means, said overrunning means permitting rotation of the first said control member in a direction opposite to that aforesaid during the last two of said three speed ratio drives.

6. In a motor vehicle planetary gear transmission; a power driving shaft; a driven shaft coaxial with the driving shaft; planetary gearing operable between said shafts for driving the driven shaft from the driving shaft, said planetary gearing having a rotary control element provided with an annular drum splined internally and externally; a casing structure for the transmission; annular friction braking elements respectively connected to the casing structure and to the external splines of said drum; annular friction clutching elements respectively drivingly connected to the driving shaft and to the internal splines of said drum; a pressure fluid operated motor adapted to engage said braking elements to provide a drive through the planetary gearing whereby the driven shaft is driven at a speed different from that of the driving shaft; and a second pressure fluid operated motor adapted to engage said clutching elements whereby the driven shaft is driven at the same speed as that of the driving shaft.

7. In a motor vehicle planetary gear transmission; a power driving shaft; a driven shaft coaxial with the driving shaft; planetary gearing operable between said shafts for driving the driven shaft from the driving shaft, said planetary gearing having a rotary control element adapted to be selectively held against rotation or drivingly connected to the driving shaft; braking means operable to engage said control element; clutching means drivingly connected to the driving shaft and adapted to engage said control element; a pair of annular pistons disposed concentrically one within the other for respectively operating said braking means and said clutching means; and means for supplying pressure fluid to said pistons.

8. In a motor vehicle planetary gear transmission; a power driving shaft; a driven shaft coaxial with the driving shaft; planetary gearing operable between said shafts for driving the driven shaft from the driving shaft, said planetary gearing having a rotary control element adapted to be clutched to the driving shaft; a spring-receiving cage driven by the driving shaft; springs carried by said cage; clutching elements respectively drivingly connected to said control element and to said cage; and an annular pressure fluid actuated piston operable to engage said clutching elements; said springs acting to oppose operation of said piston.

9. In a motor vehicle planetary gear transmission; a power driving shaft; a driven shaft coaxial with the driving shaft; planetary gearing operable between said shafts for driving the driven shaft from the driving shaft, said planetary gearing having a rotary control element adapted to be clutched to the driving shaft; clutching elements respectively drivingly connected to said control element and to said driving shaft; an annular pressure fluid-receiving cylinder surrounding the driving shaft and adapted to be drivingly connected thereto, said cylinder having concentrically disposed inner and outer cylindrical flanges one of which has a fluid inlet port formed therethrough for admitting fluid into the cylinder; an annular pressure fluid operated piston slidable in said cylinder for engaging said clutching elements; a fixed fluid conducting member having a ported annular portion thereof disposed externally adjacent the ported flange of said cylinder for conducting pressure fluid from the port of said fixed conducting member to the port of said cylinder flange; a pair of sealing rings between said fixed member and said ported flange for preventing escape of fluid, said sealing rings being so disposed as to accommodate fluid flow therebetween during passage between said ports; and means for supplying fluid under pressure to said fluid conducting member.

10. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at a speed relatively faster than that provided by said relatively slow speed driving means; said relatively fast speed driving means including a frictionally engageable control element operably associated therewith; pressure fluid operated means for effecting operation of said relatively fast driving means said pressure fluid operated means including a drive control member operable by the pressure fluid to frictionally engage said control element during drive of the vehicle in said relatively slow speed drive to effect said relatively fast drive; fluid pumping means for delivering pressure fluid to operate said drive control member; means for driving said fluid pumping means independently of the engine at a predetermined constant speed ratio with respect to the speed of forward travel of the vehicle so that in stopping the vehicle with the engine running the pressure of the fluid will drop below that required to operate said fluid operated means; and control means for said relatively slow speed driving means operating to effect this drive independently of said fluid pumping means for starting the vehicle, said control means operating to release the relatively slow speed drive in response to operation of the relatively fast speed drive to accommodate a step-up in the drive through said change speed mechanism when said fluid pumping means operates to restore the pressure of the fluid after the vehicle is started.

11. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at a speed relatively faster than that provided by said relatively slow speed driving means; pressure fluid operated means for effecting operation of said relatively fast driving means during drive of the vehicle in said relatively slow speed driving means; fluid pumping means for delivering pressure fluid to said fluid operated means; means for drivingly connecting said fluid pumping means with the driven shaft; and control means operable to provide said relatively slow speed drive independently of said fluid pumping means and to release this drive in response to operation of the relatively fast speed drive.

12. In a power transmission for driving a motor vehicle having an engine; a driving shaft adapted to be driven by the engine; a driven shaft adapted to drive the vehicle; change speed mechanism including planetary gearing means for driving the driven shaft from the driving shaft at a relatively slow speed and means for driving the driven shaft from the driving shaft at a speed relatively faster than that provided by said relatively slow speed driving means by locking the planetary gearing for rotation thereof as a unit; fluid operating means preselectively controlled by the vehicle driver for effecting operation of said relatively fast speed driving means in response to acceleration of the vehicle from a position of rest; said driver controlled means including a driver manipulated selector element adapted for preselective manipulation to a predetermined position of control for said relatively fast speed driving means and control means for said relatively slow speed driving means operable to effect this drive independently of said preselectively controlled means and to release this drive in response to operation of said relatively fast speed driving means such that said selector element may be left in said predetermined position in bringing the vehicle to rest preparatory to accelerating the vehicle from rest in said slow speed drive.

13. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at a speed relatively faster than that provided by said relatively slow speed driving means; pressure fluid supplying means preselectively controlled by the vehicle driver for effecting operation of said relatively fast speed driving means in response to acceleration of the vehicle from a position of rest, said pressure fluid operating means including fluid pressure-generating means dependent for pressure fluid generation upon movement of the vehicle; means for driving said fluid pressure-generating means at a constant speed ratio with respect to the speed of forward travel of the vehicle; and control means for said relatively slow speed driving means operable to effect this drive independently of said fluid pressure-generating means and to release this drive in response to operation of said relatively fast speed driving means.

14. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at different speeds relatively faster than that provided by said relatively slow speed driving means; means preselectively controlled by the vehicle driver for effecting operation of said relatively faster speed driving means for driving the vehicle selectively in one of said different speeds in response to acceleration of the vehicle from a position of rest; and control means for said relatively slow speed driving means operable to effect this drive independently of said preselectively controlled means and to release this drive in response to operation of either of said relatively fast speed driving means.

15. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at different speeds relatively faster than that provided by said relatively slow speed driving means; pressure fluid supplying means preselectively controlled by the vehicle driver for effecting operation of said relatively faster speed driving means in accordance with the preselective setting of said preselectively controlled means for driving the vehicle selectively in one of said different speeds in response to acceleration of the vehicle from a position of rest, said pressure fluid operating means including fluid pressure-generating means dependent for fluid pressure generation upon movement of the vehicle; means for driving said fluid generating-means at a predetermined fixed speed ratio with respect to the speed of forward travel of the vehicle; and control means for said relatively slow speed driving means operable to effect this drive independently of said fluid pressure-generating means and to release this drive in response to operation of either of said relatively fast speed driving means.

16. In a power transmission for driving a motor vehicle having an engine; a driving shaft adapted to receive drive in a forwardly rotating direction from the engine; a tailshaft adapted to receive drive from the driving shaft for driving the vehicle forwardly or in reverse; speed ratio driving mechanism operably connected to the driving shaft and having a pair of clutch elements adapted to be driven thereby respectively forwardly and reversely; a shiftable clutch member drivingly connected to the tailshaft and adapted for selective clutch with said forwardly and reversely driven clutch elements; said speed ratio mechanism including gearing having a plurality of rotary control elements adapted for engagement to effect predetermined forward speed ratio drives from the driving shaft to said forwardly driven clutch element; devices respectively operable to engage said control elements; pressure fluid operated motors respectively adapted to operate said devices; a pump adapted to be driven at a speed proportionate with the tailshaft for delivering fluid under pressure to said devices; said speed ratio driving mechanism including means establishing a forward speed ratio drive from the driving shaft to said forwardly driven clutch element independently of pressure fluid delivery from said pump.

17. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at a speed relatively faster than that provided by said relatively slow speed driving means; pressure fluid operated means for effecting operation of said relatively fast driving means; fluid pumping means for delivering pressure fluid to said fluid operated means; means for driving said fluid pumping means independently of the engine at a predetermined constant speed ratio with respect to the speed of forward travel of the vehicle so that in stopping the vehicle with the engine running the pressure of the fluid will drop below that required to operate said fluid operated means; control means for said relatively slow speed driving means operating to effect this drive independently of said fluid pumping means for starting the vehicle, said control means operating to release the relatively slow speed drive in response to operation of the relatively fast speed drive to accommodate a step-up in the drive through said change speed mechanism when said fluid pumping means operates to restore the pressure of the fluid after the vehicle is started; and means under control of the vehicle driver while driving the vehicle for regulating the rate of pressure fluid build-up of said fluid pumping means when the vehicle is started.

18. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at a speed relatively faster than that provided by said relatively slow speed driving means; pressure fluid supplying means preselectively controlled by the vehicle driver for effecting operation of said relatively fast speed driving means in response to acceleration of the vehicle from a position of rest, said pressure fluid operating means including fluid pressure-generating means dependent for pressure fluid generation upon movement of the vehicle; means for driving said fluid pressure-generating means at a constant speed ratio with respect to the speed of forward travel of the vehicle; control means for said relatively slow speed driving means operable to effect this drive independently of said fluid pressure-generating means and to release this drive in response to operation of said relatively fast speed driving means; and regulatable means under control of the vehicle driver while driving the vehicle for venting said pressure-generating means thereby to vary the rate of pressure fluid build-up during said acceleration of the vehicle.

19. In a motor vehicle planetary gear transmission; a driving shaft adapted to be driven in a forward driving direction of rotation; a shaft adapted to be driven from said driving shaft; means including planetary gearing for driving the driven shaft from the driving shaft in said forward direction of rotation at a plurality of relatively different speed ratios; said planetary gearing driving means including a rotatable sun gear and a rotatable annulus gear; overrunning braking means for automatically preventing rotation of said annulus gear in one direction to effect one of said speed ratio drives for driving the driven shaft; a rotatable member adapted to be braked; overrunning means between said rotatable member and said sun gear for preventing rotation of this sun gear in one direction when said rotatable member is braked to effect another of said speed ratio drives; and releasable braking means for said rotatable member.

20. In a motor vehicle planetary gear transmission; a driving shaft adapted for forward driving rotation; a shaft adapted to be driven from said driving shaft; means including planetary gearing for driving said driven shaft from said driving shaft at two relatively different forward driving speed ratios, said planetary gearing having a pair of rotary control members; overrunning means operable automatically to prevent rotation of one of said control members in one direction for effecting the slower of said speed ratio drives; a rotatable reaction-taking element adapted to be braked; releasable braking means for said reaction-taking element; and overrunning means between said reaction-taking element and the other of said control members for effecting the faster of said speed ratio drives when said reaction-taking element is braked by said braking means; the first said overrunning means permitting rotation of the first said control member in a direction opposite to that aforesaid during said faster drive.

21. In a motor vehicle planetary gear transmission; a driving shaft adapted for forward driving rotation; a shaft adapted to be driven from said driving shaft; means including planetary gearing for driving said driven shaft from said driving shaft in three relatively different forward driving speed ratios, said planetary gearing having a pair of rotary control elements; overrunning means operable automatically to prevent rotation of one of said control members in one direction for effecting the slowest of said three speed ratio drives; a rotatable structure adapted to be braked; releasable braking means for said rotatable structure; overrunning means operable when said rotatable structure is braked to prevent rotation of the other of said control members in one direction for effecting another of said three speed ratio drives; and clutch means operable to lock said planetary gearing for rotation as a unit with one of said shafts for effecting the third of said three speed ratio drives; said overrunning means permitting rotation of said control members respectively in a direction opposite to that aforesaid during the third said speed ratio drive.

22. In a motor vehicle planetary gear transmission having driving and driven shafts; means for driving the driven shaft from the driving shaft at a speed slower than that of the driving shaft; said driving means including a sun gear drivingly connected with the driving shaft, a planet gear meshing with the sun gear and having a carrier therefor drivingly connected with the driven shaft, and an annulus gear meshing with the sun gear; overrunning control means for controlling the rotation of said annulus gear; said control means operating to automatically prevent rotation of said annulus gear in the direction of rotational tendency thereof caused by drive of the sun gear thereby to provide the reaction of said slower speed drive; second means for driving the driven shaft from the driving shaft at a speed slower than that of the driving shaft but faster than the first said driving means; said second driving means including a second planet gear and carrier therefor directly drivingly connected with the first said annulus gear, a second annulus gear directly drivingly connected with the first said carrier and meshing with the second planet gear, and a second sun gear rotatable relative to said shafts and meshing with the second planet gear; a rotary control member to be braked; releasable braking means for said control member; and overrunning means between said control member and said second sun gear to prevent rotation in one direction of said second sun gear when said control member is braked thereby to effect operation of said second driving means by compounding the gears of the first said driving means; said overrunning control means permitting rotation of the first said annulus gear in a direction opposite to that aforesaid during operation of said second driving means.

23. In a motor vehicle planetary gear transmission having driving and driven shafts; means for driving the driven shaft from the driving shaft at a speed slower than that of the driving shaft; said driving means including a sun gear drivingly connected with the driving shaft, a planet gear meshing with the sun gear and having a carrier therefor drivingly connected with the driven shaft, and an annulus gear meshing with the sun gear; overrunning control means for controlling the rotation of said annulus gear; said control means operating to automatically prevent rotation of said annulus gear in the direction of rotational tendency thereof caused by drive of the sun gear thereby to provide the reaction for said slower speed drive; second means for driving the driven shaft from the driving shaft at a speed slower than that of the driving shaft but faster than the first said driving means; said second driving means including a second planet gear and carrier therefor directly drivingly connected with the first said annulus gear, a second annulus gear directly drivingly connected with the first said carrier and meshing with the second planet gear, and a second sun gear rotatable relative to said shafts and meshing with the second planet gear; a rotary control member to be braked; releasable braking means for said control member; overrunning means between said control member and said second sun gear to prevent rotation in one direction of said second sun gear when said control member is braked thereby to effect operation of said second driving means by compounding the gears of the first said driving means; and means operable to lock all of the gears aforesaid together for rotation as a unit with said shafts for effecting a direct drive from said driving shaft to said driven shaft; said overrunning control means permitting rotation of the first said annulus gear in a direction opposite to that aforesaid during operation of said second driving means and said direct drive and during operation of said direct drive; said overrunning means permitting rotation of said second sun gear in a direction opposite to that aforesaid during operation of said direct drive.

24. In a motor vehicle planetary gear transmission; a driving shaft adapted for forward driving rotation; a shaft adapted to be driven from the driving shaft; means including planetary gearing for driving the driven shaft from the driving shaft at two relatively different forward driving speed ratios, said planetary gearing having a member thereof adapted to be held against backward rotating tendency to provide the slower of said speed ratio drives; a rotatable control element; overrunning means between said gearing member and said control element operating to prevent said gearing member from rotating backward faster than said control element and to permit said gearing member to rotate forward faster than said control element; braking means for said control element; means operable to effect operation or release of said braking means; means for locking said planetary gearing to effect direct driving connection between said shafts thereby to provide the faster of said speed ratio drives; and overrunning clutch means between the driving shaft and said gearing member for preventing said gearing member from rotating faster than the driving shaft and in the same direction of rotation as that of the driving shaft.

25. In a motor vehicle transmission having driving and driven shafts; means for driving the driven shaft from the driving shaft at a speed different than that of the driving shaft and in the same direction of rotation as that of the driving shaft; said driving means including a rotatable reaction-taking member; a rotatable control element; braking means operable to control rotation of said control element; overrunning control means between said reaction-taking member and said control element operable to automatically prevent rotation of said reaction-taking member faster than said control element in a direction opposite to that of the driving shaft; and overrunning clutch means between the driving shaft and said reaction-taking member for preventing this member from rotating faster than the driving shaft and in the same direction of rotation as that of the driving shaft.

26. In a motor vehicle planetary gear transmission; a driving shaft adapted for forward driving rotation; a shaft adapted to be driven from the driving shaft; means including planetary gearing for driving the driven shaft from the driving shaft at a speed different from that of the driving shaft, said planetary gearing having a member thereof adapted to be held against backward rotating tendency to effect said different speed drive; a rotatable control element adapted to be braked; overrunning means between said planetary gearing member and said control element operating to prevent said planetary gearing member from rotating backward faster than said control element and to permit said planetary gearing member to rotate forward faster than said control element; braking means for said control element; means operable to effect operation or release of said braking means; and overrunning clutch means between the driving shaft and said planetary gearing member for preventing this member from rotating faster than the driving shaft and in the same direction of rotation as that of the driving shaft.

27. In a motor vehicle planetary gear transmission having driving and driven shafts; means for driving the driven shaft from the driving shaft at a speed slower than that of the driving shaft; said driving means including a sun gear drivingly connected with the driving shaft, a planet gear meshing with the sun gear and having a carrier therefor drivingly connected with the driven shaft, and an annulus gear meshing with the sun gear; overrunning control means for controlling the rotation of said annulus gear; said control means operating to automatically prevent rotation of said annulus gear in the direction of rotational tendency thereof caused by drive of the sun gear thereby to provide the reaction for said slower speed drive; second means for driving the driven shaft from the driving shaft at a speed slower than that of the driving shaft but faster than the first said driving means; said second driving means including a second planet gear and carrier therefor directly drivingly connected with the first said annulus gear, a second annulus gear directly drivingly connected with the first said carrier and meshing with the second planet gear, and a second sun gear rotatable relative to said shafts and meshing with the second planet gear; a rotary control member adapted to be braked; releasable braking means for said control member; overrunning means between said control member and said second sun gear to prevent rotation in one direction of said second sun gear when said control member is braked thereby to effect operation of said second driving means by compounding the gears of the first said driving means; said overrunning control means permitting rotation of the first said annulus gear in a direction opposite to that aforesaid during operation of said second driving means; and overrunning clutch means between the driving shaft and one of the gears aforesaid for preventing the driving shaft from rotating slower than the driven shaft and in the same direction of rotation.

28. In a motor vehicle planetary gear transmission having driving and driven shafts; means for driving the driven shaft from the driving shaft at a speed slower than that of the driving shaft; said driving means including a sun gear drivingly connected with the driving shaft, a planet gear meshing with the sun gear and having a carrier therefor drivingly connected with the driven shaft, and an annulus gear meshing with the sun gear; overrunning control means for controlling the rotation of said annulus gear; said control means operating to automatically prevent rotation of said annulus gear in the direction of rotational tendency thereof caused by drive of the sun gear thereby to provide the reaction for said slower speed drive; second means for driving the driven shaft from the driving shaft at a speed slower than that of the driving shaft but faster than the first said driving means; said second driving means including a second planet gear and carrier therefor directly drivingly connected with the first said annulus gear, a second annulus gear directly drivingly connected with the first said carrier and meshing with the second planet gear, and a second sun to be driven by the engine; a driven shaft adapted to drive the vehicle; change speed mechanism including means for driving the driven shaft from the driving shaft at a relatively slow speed and means for driving the driven shaft from the driving shaft at a speed relatively faster than that provided by said relatively slow speed driving means; said relatively fast speed driving means including a frictionally engageable rotatable control element operably associated therewith and adapted to be held against rotation to effect operation of this driving means; pressure fluid operated braking means operable to frictionally brake said rotatable control element; fluid pumping means for delivering pressure fluid to operate said braking means; means for driving said fluid pumping means independently of the engine so that in stopping the vehicle with the engine running the pressure of the fluid will drop below that required to operate said fluid operated means; and control means for said relatively slow speed driving means operating to effect this drive independently of said fluid pumping means for starting the vehicle, said control means operating to release the relatively slow speed drive in response to operation of the relatively fast speed drive to accommodate a step-up in the drive through said change speed mechanism when said fluid pumping means operates to restore the pressure of the fluid after the vehicle is started.

54. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at a speed relatively faster than that provided by said relatively slow speed driving means; said relatively fast speed driving means including a frictionally engageable rotatable control element operably associated therewith and adapted to be clutched for rotation in unison with one of said shafts to effect operation of this driving means; pressure fluid operated clutching means operable to frictionally clutch said rotatable control element for rotation in unison with one of said shafts; fluid pumping means for delivering pressure fluid to operate said clutching means; means for driving said fluid pumping means independently of the engine at a predetermined constant speed ratio with respect to the speed of forward travel of the vehicle so that in stopping the vehicle with the engine running the pressure of the fluid will drop below that required to operate said fluid operated means; and control means for said relatively slow speed driving means operating to effect this drive independently of said fluid pumping means for starting the vehicle, said control means operating to release the relatively slow speed drive in response to operation of the relatively fast speed drive to accommodate a step-up in the drive through said change speed mechanism when said fluid pumping means operates to restore the pressure of the fluid after the vehicle is started.

55. In a motor vehicle planetary gear transmission having driving and driven shafts; planetary gear means for driving the driven shaft from the driving shaft at a speed different than that of the driving shaft, said planetary gear means including a rotatable control member adapted to be held against rotation in one direction to take reaction of said different speed drive; and overrunning control device for holding said control member and including coaxial overrunning elements one of which is connected to said control member; an abutment; and yielding means between said abutment and the other of said overrunning elements for cushioning reaction rotational tendency of said control member.

56. In a motor vehicle planetary gear transmission having driving and driven shafts; planetary gear means for driving the driven shaft from the driving shaft at a speed different than that of the driving shaft, said planetary gear means including a rotatable control member adapted to be held against rotation in one direction to take reaction of said different speed drive; an overrunning control device for holding said control member and including coaxial overrunning elements one of which is connected to said control member; a support for the other of said overrunning elements; and a body of non-metallic yielding material intermediate the support and said other overrunning element.

57. In a power transmission having a power transmitting element; a sleeve drivingly connected to said element; a member surrounding said sleeve; a second member disposed within said sleeve; overrunning devices disposed between said sleeve and each of said members, said overrunning devices being adapted to lock said sleeve to the first said member in one direction of rotational tendency of said sleeve and to lock said sleeve to said second member in the opposite direction of rotational tendency of said sleeve; and yielding means operatively associated with one of said members for accommodating limited displacement thereof.

58. In a power transmission having a power transmitting element; a sleeve drivingly connected to said element; a member surrounding said sleeve; a second member disposed within said sleeve; overrunning devices disposed between said sleeve and each of said members and adapted to lock said sleeve to said members; and yieldable means operatively associated with one of said members for relieving eccentric loading incident to misalignment of said sleeve and members.

59. In a motor vehicle transmission having a forwardly rotating driving shaft and a driven shaft; means for driving the driven shaft forwardly from the driving shaft at a speed different from that of the driving shaft, said driving means including a gear train having a rotatable reaction-taking member adapted to be held against backward rotation to effect said different speed drive; holding means for said member; overrunning control means operating between said holding means and said member to automatically connect said member with said holding means in response to backward rotational tendency of said member and to release said member from said holding means in response to forward rotation of said member; and overrunning clutch means operating between one of said shafts and said member to automatically clutch said member with this shaft in response to forward rotational tendency of said member faster than this shaft and to release said member from this shaft in response to backward rotational tendency of said member.

60. In a motor vehicle transmission having a forwardly rotating driving shaft and a driven shaft; means for driving the driven shaft forwardly from the driving shaft at a speed different from that of the driving shaft, said driving means including a gear train having a rotatable reaction-taking member adapted to be held against backward rotation to effect said different speed drive; holding means for said member; overrunning control means operating between said holding means and said member to automatically connect said member with said holding means in response to backward rotational tendency of said member and to release said member from said holding means in response to forward rotation of said member; overrunning clutch means operating between one of said shafts and said member to automatically clutch said member with this shaft in response to forward rotational tendency of said member faster than this shaft and to release said member from this shaft in response to backward rotational tendency of said member, and means for clutching said member with the last mentioned shaft for direct drive of said member forwardly with this shaft.

61. In a motor vehicle transmission having driving and driven shafts; means for driving the driven shaft from the driving shaft at a speed different than that of the driving shaft, said driving means including a gear train having a rotatable reaction-taking member adapted to be held against rotation in one direction to effect said different speed drive; overrunning control means operable to automatically hold said member against rotation thereof in the direction urged by said gear train driving means thereby to take the reaction incident to said different speed drive; overrunning clutch means between said member and one of said shafts operating to prevent rotation of said member faster than this shaft in a direction opposite to that aforesaid; and means for clutching said member with the last said shaft for direct drive therewith.

62. In a drive for a motor vehicle having an engine and a tailshaft adapted to transmit drive from the engine to the vehicle, change speed mechanism comprising means operable to drive the tailshaft from the engine at a plurality of relatively different speed ratios so as to drive the vehicle in a relatively slow speed drive and at least two other drives each of relatively faster speed than that provided by said slow speed driving means, a selector element mounted for preselective manipulation by the vehicle driver to positions for respectively controlling operation of each of said faster drives, control means for said relatively slow drive operating when the vehicle is at rest and when said selector element is at either of said positions of controlling said faster drives to provide drive relationship from the engine to the tailshaft in said slow speed such that the vehicle may be accelerated from a position of rest, control means for said relatively faster drives operating in response to accelerating the vehicle from rest to effect operation of, and to limit step-up in the speed ratio drives of said change speed mechanism to, that one of said faster drives which corresponds to the preselective positioning of said selector element and to release this one drive in bringing the vehicle to rest without altering the preselective setting of said selector element, said control means for said relatively slow drive operating to establish said slow drive in bringing the vehicle to rest from a condition of drive in either of said faster drives such that said selector element may be left in either of its said positions of controlling said faster drives and the vehicle operated in successive cycles of firstly, initially accelerating the vehicle from rest in said slow drive with automatic step-up in the drive speed ratio either by functioning of the control means for one of said faster drives or by functioning of the control means for each of said faster drives and secondly, bringing the vehicle to rest.

63. In a drive for a motor vehicle having an engine and a tailshaft adapted to transmit drive from the engine to the vehicle, change speed mechanism comprising means operable to drive the tailshaft from the engine at a plurality of relatively different speed ratios so as to drive the vehicle in a relatively slow speed drive and at least two other drives each of relatively faster speed than that provided by said slow speed driving means, a selector element mounted for preselective manipulation by the vehicle driver to positions for respectively controlling operation of each of said faster drives, pressure fluid control means for said relatively faster drives operating in response to accelerating the vehicle from rest to effect operation of, and to limit step-up in the speed ratio drives of said change speed mechanism to, that one of said faster drives which corresponds to the preselective positioning of said selector element and to release this one drive in bringing the vehicle to rest without altering the preselective setting of said selector element, said pressure fluid operating means including a source of fluid and a pump adapted to be driven independently of the engine at a constant speed ratio with respect to the speed of travel of the vehicle, control means for said relatively slow drive operating when the vehicle is at rest and when said selector element is at either of said positions of controlling said faster drives to provide drive relationship from the engine to the tailshaft in said slow speed such that the vehicle may be accelerated from a position of rest, said control means for said relatively slow drive operating to establish said slow drive in bringing the vehicle to rest from a condition of drive in either of said faster drives such that said selector element may be left in either of its said positions of controlling said faster drives and the vehicle operated in successive cycles of firstly, initially accelerating the vehicle from rest in said slow drive with automatic step-up in the drive speed ratio either by functioning of the pressure fluid control means for one of said faster drives for a single step-up or by functioning of the pressure fluid control means for each of said faster drives for multiple step-up and secondly, bringing the vehicle to rest.

64. In a drive for a motor vehicle having an engine and a tailshaft adapted to transmit drive from the engine to the vehicle, change speed mechanism comprising means operable to drive the tailshaft from the engine at a plurality of relatively different speed ratios so as to drive the vehicle in a relatively slow speed drive and at least two other drives each of relatively faster speed than that provided by said slow speed driving means, a selector element mounted for preselective manipulation by the vehicle driver to positions for respectively controlling operation of each of said faster drives, control means for said relatively slow drive operating when the vehicle is at rest and when said selector element is at either of said positions of controlling said faster drives to provide drive relationship from the engine to the tailshaft in said slow speed such that the vehicle may be accelerated from a position of rest, control means for the slower of said relatively faster drives operating during acceleration of the vehicle ward in response to said forward driving rotation of the driving shaft; means for holding said extension against backward rotation to provide a forward reduction drive from the driving shaft to the driven shaft; and overrunning clutch means between the driving shaft and said extension operable to prevent the driving shaft from dropping below the speed of rotation of the driven shaft.

41. In a motor vehicle planetary transmission; a forwardly rotating power driving shaft; a driven shaft adapted to be driven forwardly from said driving shaft; a sun gear adapted to be driven with the driving shaft; a planet gear meshing with the sun gear and having a carrier adapted to directly drive the driven shaft; an annulus gear meshing with the planet gear and having a reaction-taking extension tending to rotate backward in response to said forward driving rotation of the driving shaft; means for holding said extension against backward rotation to provide a forward reduction drive from the driving shaft to the driven shaft; means for establishing a direct drive connection from the driving shaft to said extension to provide a direct drive from the driving shaft to the driven shaft; a second annulus gear driven with the driven shaft; a second planet gear meshing with the second annulus gear and having a carrier driven with the first said annulus gear; a second sun gear meshing with the second annulus gear; and releasable means for holding the second sun gear against backward rotation to provide a further forward reduction drive from the driving shaft to the driven shaft by compounding the first and second said gears.

42. In a motor vehicle planetary transmission; a forwardly rotating power driving shaft; a driven shaft adapted to be driven forwardly from said driving shaft; a sun gear adapted to be driven with the driving shaft; a planet gear meshing with the sun gear and having a carrier adapted to directly drive the driven shaft; an annulus gear meshing with the planet gear and having a reaction-taking extension tending to rotate backward in response to said forward driving rotation of the driving shaft; means for holding said extension against backward rotation to provide a forward reduction drive from the driving shaft to the driven shaft; means for establishing a direct drive connection from the driving shaft to said extension to provide a direct drive from the driving shaft to the driven shaft; a second annulus gear driven with the driven shaft; a second planet gear meshing with the second annulus gear and having a carrier driven with the first said annulus gear; a second sun gear meshing with the second annulus gear; a rotatable brake element; overrunning means between said brake element and the second sun gear for preventing backward rotation of the second sun gear faster than the backward rotation of said brake element; releasable braking means for holding the brake element against backward rotation to provide a further forward reduction drive from the driving shaft to the driven shaft by compounding the first and second said gears.

43. In a motor vehicle planetary gear transmission; a forwardly rotating power driving shaft; a forwardly rotatable driven shaft adapted to receive drive from the driving shaft; a tailshaft adapted to be rotatably driven forwardly or backwardly for driving the vehicle forwardly or in reverse; planetary gear means for driving the driven shaft forwardly from the driving shaft at a speed different than that of the driving shaft, said planetary gear means including a rotatable control element adapted to be held to effect said different speed drive; a brake element; overrunning means between said brake element and said control element for preventing backward rotation of the control element faster than backward rotation of the brake element; releasable braking means for holding said brake element against backward rotation; a stationary annulus gear; a sun gear rotatable with the brake element; a planet gear meshing with said sun and annulus gears and having a carrier; and means establishing selective drive to the tailshaft either from the driven shaft to provide forward tailshaft drive or from the planet gear carrier to provide backward tailshaft drive.

44. In a motor vehicle planetary gear transmission; a forwardly rotating power driving shaft; a forwardly rotatable driven shaft adapted to receive drive from the driving shaft; a tailshaft adapted to be rotatably driven forwardly or backwardly for driving the vehicle forwardly or in reverse; planetary gear means for driving the driven shaft forwardly from the driving shaft at a speed different than that of the driving shaft, said planetary gear means including a rotatable control element adapted to be held to effect said different speed drive; a brake element; overrunning means between said brake element and said control element for preventing backward rotation of the control element faster than backward rotation of the brake element; releasable braking means for holding said brake element against backward rotation; and means establishing selective drive to the tailshaft either from the driven shaft to provide forward tailshaft drive or from the brake element to provide backward tailshaft drive.

45. In a motor vehicle planetary gear transmission; a forwardly rotating power driving shaft; a forwardly rotatable driven shaft adapted to receive drive from the driving shaft; a tailshaft adapted to be rotatably driven forwardly or backwardly for driving the vehicle forwardly or in reverse; planetary gear means for driving the driven shaft forwardly from the driving shaft at a speed different than that of the driving shaft, said planetary gear means including a rotatable control element adapted to be held to effect said different speed drive; a brake element; overrunning means between said brake element and said control element for preventing backward rotation of the control element faster than backward rotation of the brake element; releasable braking means for holding said brake element against backward rotation; a set of reverse drive clutch teeth; countershaft gearing for driving said reverse drive teeth from and in the same direction of rotation as said brake element; a set of forward drive clutch teeth rotatable with the driving shaft; and a shiftable clutch member drivingly connected with the tailshaft and adapted for selective clutching with said forward or reverse drive clutch teeth.

46. In a motor vehicle transmission; a forwardly rotating power driving shaft; a driven shaft adapted to receive forward drive from the driving shaft; a tailshaft adapted for forward and backward rotation for driving the vehicle forwardly and in reverse; means for driving the driven shaft forwardly from the driving shaft at a speed different than that of the driving shaft, said driving means including a gear train having a rotatable reaction-taking member adapted to be held against backward rotation to effect said forward different speed drive to the driven shaft; a rotatable brake member; overrunning means between said reaction-taking member and said brake member preventing said reaction-taking member from rotating backward faster than backward rotation of said brake member; releasable braking means operable to hold said brake member against backward rotation to thereby brake said reaction-taking member by locking of said overrunning means; and means for establishing selective drive connection directly between the tailshaft and either the driven shaft or said brake member for respectively driving the tailshaft forward or backwardly.

47. In a motor vehicle transmission; a forwardly rotating power driving shaft; a driven shaft adapted to receive forward drive from the driving shaft; a tailshaft adapted for forward and backward rotation for driving the vehicle forwardly and in reverse; means for driving the driven shaft forwardly from the driving shaft at a speed different than that of the driving shaft, said driving means including a gear train having a rotatable reaction-taking member adapted to be held against backward rotation to effect said forward different speed drive to the driven shaft; a rotatable brake member; overrunning means between said reaction-taking member and said brake member preventing said reaction-taking member from rotating backward faster than backward rotation of said brake member; releasable braking means operable to hold said brake member against backward rotation to thereby brake said reaction-taking member by locking of said overrunning means; and means for establishing selective drive connection directly between the tailshaft and either the driven shaft or said reaction-taking member for respectively driving the tailshaft forwardly or backwardly.

48. In a motor vehicle transmission having driving and driven shafts; means for driving the driven shaft from the driving shaft at a speed different than that of the driving shaft; a tailshaft adapted to be driven from the driving shaft for driving the vehicle; overrunning clutch means between the driving shaft and the driven shaft for preventing the driving shaft from dropping below the speed of the driven shaft in the same forwardly driving direction; clutch means selectively operable either to drivingly connect the tailshaft with the driven shaft or to disconnect the tailshaft from the driven shaft; and overrunning clutch means between the driven shaft and the tailshaft for preventing the driven shaft from dropping below the speed of the tailshaft in the same forwardly driving direction when said clutch means is operated to disconnect the tailshaft from the driven shaft.

49. In a motor vehicle planetary gear transmission; a driving shaft adapted for forward driving rotation; a shaft adapted to be driven from the driving shaft; means including planetary gearing for driving the driven shaft from the driving shaft at two relatively different forward driving speed ratios, said planetary gearing having a member thereof adapted to be held against backward rotating tendency to provide the slower of said speed ratio drives; a rotatable control element; overrunning means between said gearing member and said control element operating to prevent said gearing member from rotating backward faster than said control element and to permit said gearing member to rotate forward faster than said control element;

pressure fluid operated braking means for said control element to provide the slower of said two speed ratio drives; pressure fluid operated clutching means for drivingly connecting said gearing member with the driving shaft to thereby lock the planetary gearing to provide the faster of said two speed ratio drives; and valving means operable to supply fluid under pressure either to said braking means or to both said braking means and clutching means.

50. In a motor vehicle planetary gear transmission; a driving shaft adapted for forward driving rotation; a shaft adapted to be driven from said driving shaft; means including planetary gearing for driving said driven shaft from said driving shaft in three relatively different forward driving speed ratios, said planetary gearing having a pair of rotary control elements; overrunning means operable automatically to prevent rotation of one of said control members in one direction for effecting the slowest of said three speed ratio drives; a rotatable structure adapted to be braked; releasable braking means for said rotatable structure; overrunning means operable when said rotatable structure is braked to prevent rotation of the other of said control members in one direction for effecting another of said three speed ratio drives; clutch means operable to lock said planetary gearing for rotation as a unit with one of said shafts for effecting the third of said shafts for effecting the third of said three speed ratio drives; said overrunning means permitting rotation of said control members respectively in a direction opposite to that aforesaid during the third said speed ratio drive; and valve controlled means operable to supply fluid under pressure either to said braking means for effecting operation thereof or to both said braking means and said clutching means for effecting operation thereof.

51. In a motor vehicle transmission; a driving shaft; a driven shaft; planetary gearing means including an overrunning vehicle-drive reaction-taking device operable to drive the driven shaft from the driving shaft at a reduced speed; second planetary gearing means including a second overrunning vehicle-drive reaction-taking device operable to drive the driven shaft from the driving shaft at a speed faster than that aforesaid, the second said device being free from vehicle-drive reaction during operation of the first driving means, the first said device being free from vehicle-drive reaction during operation of the second driving means; and third means operable to drive the driven shaft from the driving shaft at a speed faster than both of the aforesaid driving speeds, each of said devices being free from vehicle drive reaction during operation of the third driving means.

52. In a motor vehicle planetary gear transmission; a power driving shaft; a driven shaft coaxial with the driving shaft; planetary gearing operable between said shafts for driving the driven shaft from the driving shaft, said planetary gearing having a rotary control element adapted to be selectively held against rotation or drivingly connected to the driving shaft; a group of braking discs operable to brake said control element; a group of clutching discs drivingly connected to the driving shaft and operable to clutch with said control element; said groups of discs being concentrically disposed one within the other; and means for operating said groups of discs.

53. In a power transmission for driving a motor vehicle having an engine; a driving shaft adapted from rest in said slow drive to effect operation of the slower of said faster drives when said selector element has been preselectively positioned for operation of this drive and to release this drive in bringing the vehicle to rest without altering this preselective position of said selector element, control means for the faster of said relatively faster drives operating during acceleration of the vehicle to effect operation of the faster of said faster drives when the selector element has been preselectively positioned for operation of this drive and to release this drive in bringing the vehicle to rest without altering this preselective position of said selector element, said control means for said relatively slow drive operating to establish said slow drive in bringing the vehicle to rest from a condition of drive in either of said faster drives such that said selector element may be left in either of its said positions of controlling said faster drives and the vehicle operated in either of two cycles, one of said cycles of vehicle operation comprising initially accelerating the vehicle from rest in the speed ratio afforded by said slow drive with automatic step-up during vehicle drive to the speed ratio afforded by the slower of said faster drives and bringing the vehicle to rest, the other of said cycles of vehicle operation comprising initially accelerating the vehicle from rest in the speed ratio afforded by said slow drive with automatic multiple step-up during vehicle drive to the speed ratio afforded by the slower of said drives and thereafter to the speed ratio afforded by the faster of said drives and bringing the vehicle to rest.

CARL A. NERACHER.
WILLIAM T. DUNN.

CERTIFICATE OF CORRECTION.

Patent No. 2,232,797. February 25, 1941.

CARL A. NERACHER, ET AL.

It is hereby certified that error appears in the printed specification of the above numbered patent requiring correction as follows: Page 11, second column, line 3, after "coast" insert --even--; and that the said Letters Patent should be read with this correction therein that the same may conform to the record of the case in the Patent Office.

Signed and sealed this 20th day of October, A. D. 1942.

(Seal)

Henry Van Arsdale,
Acting Commissioner of Patents.

CERTIFICATE OF CORRECTION.

Patent No. 2,232,797. February 25, 1941.

CARL A. NERACHER, ET AL.

It is hereby certified that error appears in the printed specification of the above numbered patent requiring correction as follows: Page 11, second column, line 3, after "coast" insert --even--; and that the said Letters Patent should be read with this correction therein that the same may conform to the record of the case in the Patent Office.

Signed and sealed this 20th day of October, A. D. 1942.

(Seal)

Henry Van Arsdale,
Acting Commissioner of Patents.